(12) United States Patent
Momose

(10) Patent No.: US 7,535,460 B2
(45) Date of Patent: May 19, 2009

(54) METHOD AND APPARATUS FOR IDENTIFYING A GRAPHIC SHAPE

(75) Inventor: Hiroshi Momose, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 876 days.

(21) Appl. No.: 10/914,112

(22) Filed: Aug. 10, 2004

(65) Prior Publication Data

US 2005/0270289 A1     Dec. 8, 2005

(30) Foreign Application Priority Data

Jun. 3, 2004    (JP)   ............................ 2004-166128

(51) Int. Cl.
     *G06F 3/041*      (2006.01)
(52) U.S. Cl. ...................... 345/173; 382/203
(58) Field of Classification Search ......... 345/173–178; 382/181, 202–203, 218–221; 715/863–864
See application file for complete search history.

(56) References Cited

U.S. PATENT DOCUMENTS

| | | |
|---|---|---|
| 4,618,927 A | 10/1986 | Hatta |
| 5,390,937 A | 2/1995 | Sakaguchi et al. |
| 5,410,494 A | 4/1995 | Hashimoto et al. |
| 5,465,325 A | 11/1995 | Capps et al. |
| 5,485,565 A | 1/1996 | Saund et al. |
| 5,500,937 A | 3/1996 | Thompson-Rohrlich |
| 5,592,608 A | 1/1997 | Weber et al. |
| 5,596,656 A | 1/1997 | Goldberg |
| 5,636,297 A | 6/1997 | Eller et al. |
| 5,638,462 A | 6/1997 | Shirakawa |
| 5,751,853 A * | 5/1998 | Michael .................. 382/203 |
| 5,798,769 A | 8/1998 | Chiu et al. |
| 5,880,717 A | 3/1999 | Chan et al. |

(Continued)

FOREIGN PATENT DOCUMENTS

JP      58-066176      4/1983

(Continued)

OTHER PUBLICATIONS

TBD: "Electronic Calculator Based on Character Recognition of Input from Stylus Acceleration Dynamics," IBM Technical Disclosure Bulletin, pp. 2816-1827 (Dec. 1976).

(Continued)

*Primary Examiner*—Chanh Nguyen
*Assistant Examiner*—Bao-Quan T Ho
(74) *Attorney, Agent, or Firm*—Nixon & Vanderhye P.C.

(57) ABSTRACT

An information processing device executing a graphics identification program detects a trace drawn on an input surface as coordinate points in chronological order. Coordinate points for representing the trace are selected from a group of coordinate points arranged in chronological order. Lengths of line segments obtained by connecting the selected coordinate points in chronological order are calculated. Also, for each line segment, an absolute angle and a relative angle are calculated. A trace graph in an orthogonal coordinate system, whose first axis indicates a line segment distance and whose second axis indicates an angle of a line segment whose startpoint is one of the selected coordinate points, is compared with a reference graphic graph representing a reference graphic in the orthogonal coordinate system, thereby identifying a reference graphic represented by a reference graphic graph which most closely resembles the trace graph as a shape of the trace.

13 Claims, 22 Drawing Sheets

U.S. PATENT DOCUMENTS

| | | |
|---|---|---|
| 5,882,262 A | 3/1999 | Ballhorn |
| 5,920,309 A * | 7/1999 | Bisset et al. ............... 345/173 |
| 6,057,830 A | 5/2000 | Chan et al. |
| 6,057,845 A | 5/2000 | Dupouy |
| 6,149,523 A | 11/2000 | Yamada et al. |
| 6,165,073 A | 12/2000 | Miyamoto et al. |
| 6,244,956 B1 | 6/2001 | Nakayama et al. |
| 6,278,445 B1 | 8/2001 | Tanaka et al. |
| 6,461,237 B1 | 10/2002 | Yoshinobu et al. |
| 6,482,086 B1 | 11/2002 | Rimoto et al. |
| 6,482,090 B1 | 11/2002 | Rimoto et al. |
| 6,493,736 B1 | 12/2002 | Forcier |
| 6,626,760 B1 | 9/2003 | Miyamoto et al. |
| 6,668,081 B1 | 12/2003 | Ilan et al. |
| 6,738,049 B2 | 5/2004 | Kiser et al. |
| 6,761,632 B2 | 7/2004 | Bansemer et al. |
| 6,966,837 B1 | 11/2005 | Best |
| 7,004,394 B2 | 2/2006 | Kim |
| 7,098,896 B2 | 8/2006 | Kushler et al. |
| 2001/0035859 A1 | 11/2001 | Kiser et al. |
| 2002/0097229 A1 | 7/2002 | Rose et al. |
| 2002/0141643 A1 | 10/2002 | Jaeger |
| 2002/0155890 A1 | 10/2002 | Ha et al. |
| 2003/0006967 A1 | 1/2003 | Pihlaja |
| 2003/0090474 A1 | 5/2003 | Schaefer |
| 2003/0216177 A1 | 11/2003 | Aonuma et al. |
| 2004/0002380 A1 | 1/2004 | Brosnan et al. |
| 2004/0014513 A1 | 1/2004 | Boon |
| 2004/0085300 A1 | 5/2004 | Matusis |
| 2004/0110560 A1 | 6/2004 | Aonuma |
| 2004/0130525 A1 | 7/2004 | Suchocki |
| 2005/0024341 A1 | 2/2005 | Gillespie et al. |
| 2005/0052406 A1 | 3/2005 | Stephanick et al. |
| 2005/0190973 A1 | 9/2005 | Kristensson et al. |

FOREIGN PATENT DOCUMENTS

| | | |
|---|---|---|
| JP | 62-082486 | 4/1987 |
| JP | 61-168347 | 2/1988 |
| JP | 01-177682 | 7/1989 |
| JP | 04-238585 | 8/1992 |
| JP | 7-29002 | 1/1995 |
| JP | 07-093560 | 4/1995 |
| JP | 10-154224 | 6/1998 |
| JP | 11-134509 | 5/1999 |
| JP | 2000-218046 | 8/2000 |
| JP | 3350009 | 9/2002 |
| JP | 2003-79943 | 3/2003 |

OTHER PUBLICATIONS

Shilman, Michael et al., "Discerning Structure from Freeform Handwritten Notes," 6 pages, (Aug. 2003).

Fonseca, Manuel et al., "Experimental Evaluation of an on-line Scribble Recognizer," 13 pages, (Oct. 2001).

Kara, Levent Burak, Ph.D. Thesis Proposal, "Sketch Understanding for Engineering Software," 68 pages (Aug. 13, 2003).

Xin, Gong et al., "HMM based online hand-drawn graphic symbol recognition," ICSP'02 2002 6th International Conference on Signal Processing Proceedings, Part vol. 2, pp. 1067-1070 (2002).

* cited by examiner

| Pn | P0 | P1 | P2 | P3 | P4 | P5 | P6 |
|---|---|---|---|---|---|---|---|
| Θn | 0 | 50 | 120 | 190 | 250 | 300 | × |
| Ln | 0 | 55 | 115 | 170 | 245 | 310 | 360 |

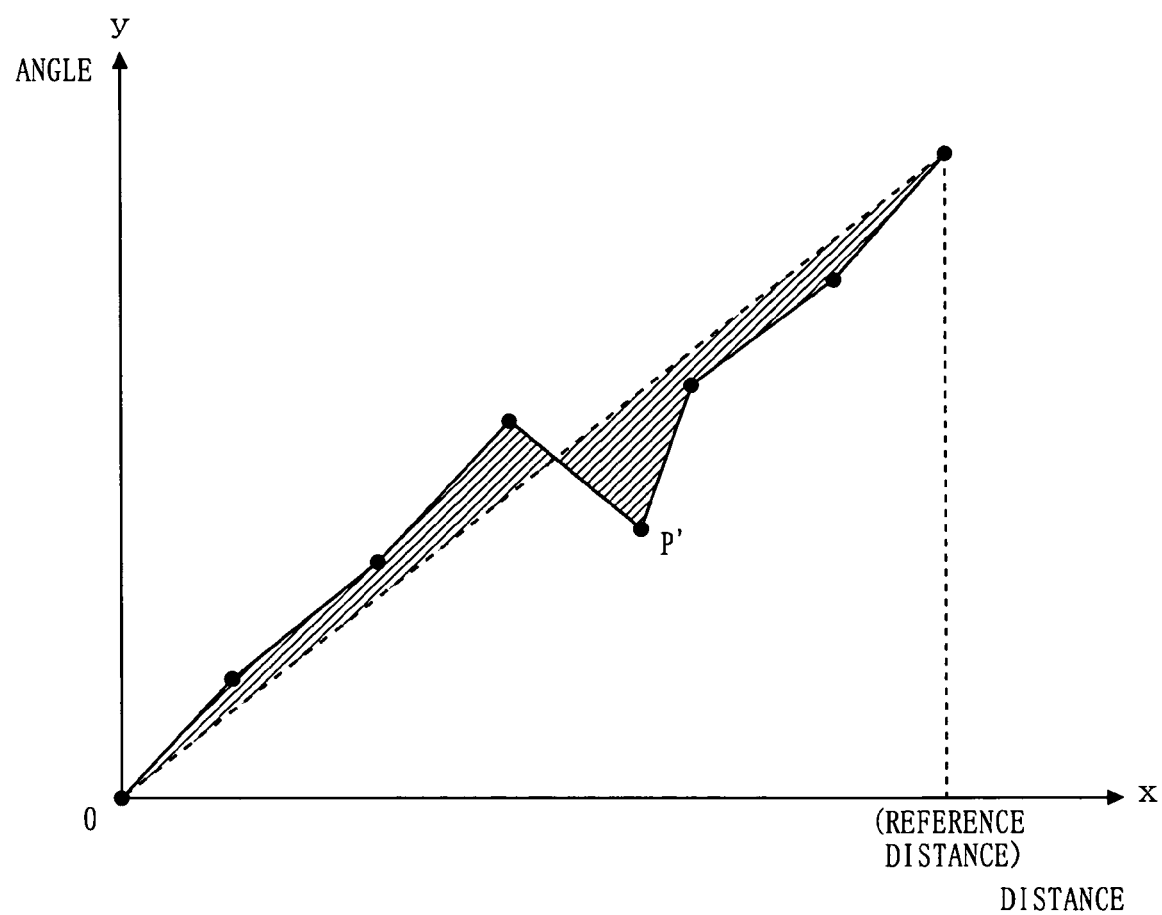

METHOD AND APPARATUS FOR IDENTIFYING A GRAPHIC SHAPE

BACKGROUND OF THE INVENTION

1. Field of the Invention

The present invention relates to a graphics identification program, and, more particularly, to a graphics identification program for identifying a shape of a graphic when the graphic is drawn or input via a touch panel, etc., leaving a trace of its passage.

2. Description of the Background Art

There have been various methods for identifying a shape of a graphic drawn on a touch panel, etc., by a user. Among them, a method for estimating the number of vertices of a drawn graphic and comparing the estimated number with the number of vertices of an ideal reference graphic is often used. For example, in the case where a simple graphic such as a triangle or a quadrangle is identified, this method facilitates identification of a shape of the graphic by comparing the numbers of vertices.

As means for identifying a graphic drawn on a tablet, Japanese Laid-Open Patent Publication No. H7-29002 discloses a graphics identification device (document 1). This graphics identification device identifies a graphic by performing the following processes. First, a line factor (corresponding to a side of a graphic) is extracted from an inputted sequence of coordinate points, and a length and an angle (direction) of each extracted side are calculated. Next, an angle histogram is generated based on the length and the angle of each side (see FIGS. 3C and 3D of Japanese Laid-Open Patent Publication No. H7-29002). Based on the angle histogram, the number of vertices (sides) of the graphic represented by the inputted sequence of coordinate points is estimated. In document 1, graphics identification is performed using the number of vertices estimated as described above.

Here, a case in which a graphic of complicated shape is identified will be considered. In general, the graphic of complicated shape has a large number of vertices, whereby it is difficult to accurately extract a line factor from the inputted sequence of coordinate points. As a result, it is difficult to estimate the number of vertices of the drawn graphic with accuracy. Also, in the case where a graphic of complicated shape is drawn, an input by the user often lacks the precision, which also makes it difficult to estimate the number of vertices of the drawn graphic with accuracy. As such, in the case where a graphic of complicated shape is identified, the probability that the estimated number of vertices of the drawn graphic is equal to the number of vertices of the ideal reference graphic is reduced. As a result, it is impossible to perform a precise comparison between the drawn graphic and the ideal reference graphic, thereby making it impossible to identify a shape of the drawn graphic with accuracy. That is, by the above-described method for estimating the number of vertices, it is difficult to identify a graphic of complicated shape.

Also, in document 1, the number of vertices is estimated using the angle histogram. However, this angle histogram does not consider an order in which the sides are drawn. Thus, in the case where a spiral-shaped graphic as shown in FIG. 22 is drawn, for example, portions (indicated by a dotted line in FIG. 22) which are determined to have the same side angles are regarded as one side. As a result, in document 1, it is impossible to differentiate between the shape as shown in FIG. 22 and a quadrangle, thereby making it impossible to precisely identify a graphic of complicated shape.

SUMMARY OF THE INVENTION

Therefore, it is a feature of the present invention to provide a graphics identification program capable of precisely identifying a graphic of complicated shape.

The present invention has the following features to attain the object mentioned above (notes in parentheses indicate exemplary elements which can be found in the embodiments to follow, though such notes are not intended to limit the scope of the invention).

A first aspect of the illustrative embodiment is directed to a storage medium for storing a graphics identification program to be executed by a computer for identifying a graphical shape of a trace drawn by a user on an input surface of an input device. The graphics identification program causes the computer (21, etc.) to execute: a detection step (S12); a coordinate point selection step (S16); a length calculation step (S45); an angle calculation step (S43, S44); and a graphics identification step (S18). The detection step detects the trace drawn on the input surface as coordinate points in chronological order. The coordinate point selection step selects coordinate points for representing the trace from among a group of the coordinate points in which the detected coordinate points are arranged in chronological order. The length calculation step calculates lengths of line segments obtained by connecting the selected coordinate points in chronological order. The angle calculation step calculates, for each line segment, an absolute angle which the line segment forms with a previously determined reference straight line or a relative angle which the line segment forms with a line segment adjacent thereto. The graphics identification step compares a trace graph (FIG. 7) in an orthogonal coordinate system, whose first axis indicates a distance (line segment distance) from a starting point or an ending point of the selected coordinate points to each coordinate point along the line segment and whose second axis indicates an angle of the line segment whose startpoint is one of the selected coordinate points, with reference graphic graphs (FIG. 8B) respectively representing a plurality of types of previously prepared reference graphics in the orthogonal coordinate system, and identifies a reference graphic represented by a reference graphic graph which most closely resembles the trace graph as a shape of the trace.

Also, based on a second aspect, the graphics identification step may include an area calculation step (S64, S67) and an identification step (S73). The area calculation step calculates an area (difference area) of a region surrounded by line segments which are not shared by the trace graph and the reference graphic graph in the orthogonal coordinate system for each reference graphic. The identification step identifies a reference graphic having the smallest area among the areas calculated at the area calculation step as a shape of the trace.

Also, based on a third aspect, the trace graph and the reference graphic graph may be represented as a step graph in which a portion corresponding to the line segment is composed of a straight line component parallel to the first axis.

Also, based on a fourth aspect, the graphics identification program may further cause the computer to execute a normalization step (S50). Before comparison between the trace graph and the reference graphic graph is performed at the graphics identification step, the normalization step normalizes a cumulative length of the trace graph while keeping a percentage of a length of each line segment of the trace graph so that a cumulative length of the line segments of the trace graph is equal to a cumulative length of the reference graphic graph.

Also, based on a fifth aspect, the coordinate point selection step may select coordinate points by thinning out a coordinate point lying within a predetermined distance from a straight line connecting two predetermined coordinate points from the group of the detected coordinate points.

Also, based on a sixth aspect, the coordinate point selection step may select all of the detected coordinate points.

Also, based on a seventh aspect, the detection step may detect the trace which is drawn without lifting a stylus from the input surface as coordinate points in chronological order.

Also, based on an eighth aspect, a display device may be connected to the computer. In this case, the graphics identification program may further cause the computer to execute a game image display step and a game process step. The game image display step displays a scene of at least a portion of a game space on the display device as a game image. The game process step causes the game image to change by executing a game process associated with the reference graphic identified as a shape of the trace at the graphics identification step depending on a type of the reference graphic.

Also, the illustrative embodiment may be supplied as an information processing device executing the above-described graphics identification program. Typically, the present invention may be supplied as a game apparatus for identifying a graphical shape of a trace drawn by a user on an input surface of an input device, changing game progress based on the identification results, and displaying the change on a display device.

According to the illustrative embodiment, a degree of similarity between the subject graphic and the reference graphic is determined based on a degree of similarity between the graphs (a trace graph and a reference graphic graph) representing the above two graphics. That is, a determination of the degree of similarity is performed by considering factors such as an angle of each line segment and a distance from a starting point or an ending point to each vertex in a comprehensive manner. Here, in the case where a graphic to be identified has a complicated shape, factors for representing characteristics of a subject graphic and a reference graphic may not be correctly extracted due to vulnerabilities to noise and inaccuracy of a process for thinning out a vertex, for example. In this case, with a method for determining a degree of similarity by focusing on one factor representing characteristics of the subject graphic, it is impossible to identify the graphic with accuracy if the above one factor is not correctly extracted. For example, with a method for determining a degree of similarity by focusing on the number of vertices of a graphic, it is impossible to identify the graphic with accuracy if the number of vertices is not correctly extracted. On the other hand, according to the present invention, a plurality of factors representing characteristics of a graphic are considered in a comprehensive manner. Thus, it is possible to identify the graphic with accuracy even if one factor is not correctly extracted due to a complicated shape of the graphic to be identified. It is especially difficult to extract the number of vertices with accuracy when graphics identification is performed for a complicated shape. However, according to the present invention, it is possible to identify a shape of the graphic with accuracy even if the number of vertices is not correctly extracted by the process for thinning out a vertex.

Also, based on the second aspect, it is possible to determine a degree of similarity between the trace graph and the reference graphic graph with accuracy, whereby it is possible to correctly perform comparison between the trace drawn by the user and the reference graphic.

Also, based on the third aspect, the trace graph and the reference graphic graph are represented as a step graph as shown in FIG. 7, for example. In such a step graph, a straight line parallel to the first axis of the graph indicates a length and an angle of a line segment of the trace. In other words, a line segment distance from a starting point or an ending point to an arbitrary point on the graph corresponds to a value of a first axis component, and an absolute angle or a relative angle of a line segment including the above arbitrary point corresponds to a value of a second axis component. Thus, by representing the trace drawn by the user and the reference graphic as the step graph, it is possible to reflect a length of a line segment connecting the detected coordinate points (vertices) in the graph. As a result, a degree of similarity is determined by considering a length of a line segment as a factor representing characteristics of the graphic, whereby it is possible to perform graphics identification with higher accuracy.

Also, especially, in the case where the trace graph and the reference graphic graph are represented as a step graph and a degree of similarity is determined based on an area of a region surrounded by line segments which are not shared by these two graphs, it is possible to easily perform a process for calculating the above area. For example, compared to a case in which the trace graph and the reference graphic graph are represented as a line graph (see FIG. 12), the calculation process of the above area can be simplified. Also, it is possible to perform graphics identification with higher accuracy since a step graph is less subject to noise compared to a case in which the area is calculated based on a line graph.

Also, based on the fourth aspect, even if a trace inputted by the user and a reference graphic are different in size, it is possible to perform comparison between the trace and the reference graphic with accuracy.

Also, based on the fifth aspect, a shape of the subject graphic can be simplified by performing the thinning-out process. As a result, it is possible to reduce a processing amount of a process for comparing the subject graphic and the reference graphic.

Also, based on the sixth aspect, the thinning-out process requiring a large processing amount can be omitted, whereby it is possible to reduce the total processing amount of the graphics identification process.

Also, based on the seventh aspect, the graphics identification process is performed regarding a trace which is drawn without lifting a stylus from the input surface as one input. That is, comparison with the reference graphic is performed using a trace which is drawn by one continuous input as a unit. Thus, based on the seventh aspect, it is possible to determine whether or not one input is performed by determining whether or not a continuous input is performed. That is, a unit of a trace (a trace by one input) to be compared with a reference graphic can be easily determined.

Also, based on the eighth aspect, it is possible to provide a novel game in which a game operation is performed by causing a player to draw a predetermined graphic, thereby allowing the player to experience a novel sensation in a game operation. Note that the player may be required to input a graphic of complicated shape in the game, whereby it is remarkably effective to apply the graphics identification program according to the present embodiment, which is capable of identifying a complicated graphic, to a game program.

These and other objects, features, aspects and advantages of the present invention will become more apparent from the

BRIEF DESCRIPTION OF THE DRAWINGS

FIG. 12 is an illustration showing one example of a line graph representing a reference graphic and a subject graphic;

DESCRIPTION OF THE PREFERRED EMBODIMENTS

Hereinafter, an information processing device and a graphics identification program according to the present invention will be described. Note that, in the present embodiment, a game apparatus having two display devices will be described as one example of the information processing device. However, the information processing device according to the present invention may be any apparatus provided with an input device allowing a player to draw a graphic and is capable of executing the graphics identification program. For example, the information processing device may be a game apparatus, a video game apparatus, or a stationary personal computer, each of which is provided with a single display device, or may be a portable terminal such as a PDA. Also, the input device includes a tablet, a touch panel, a mouse, a keyboard, and a game controller, for example.

Figure 1:
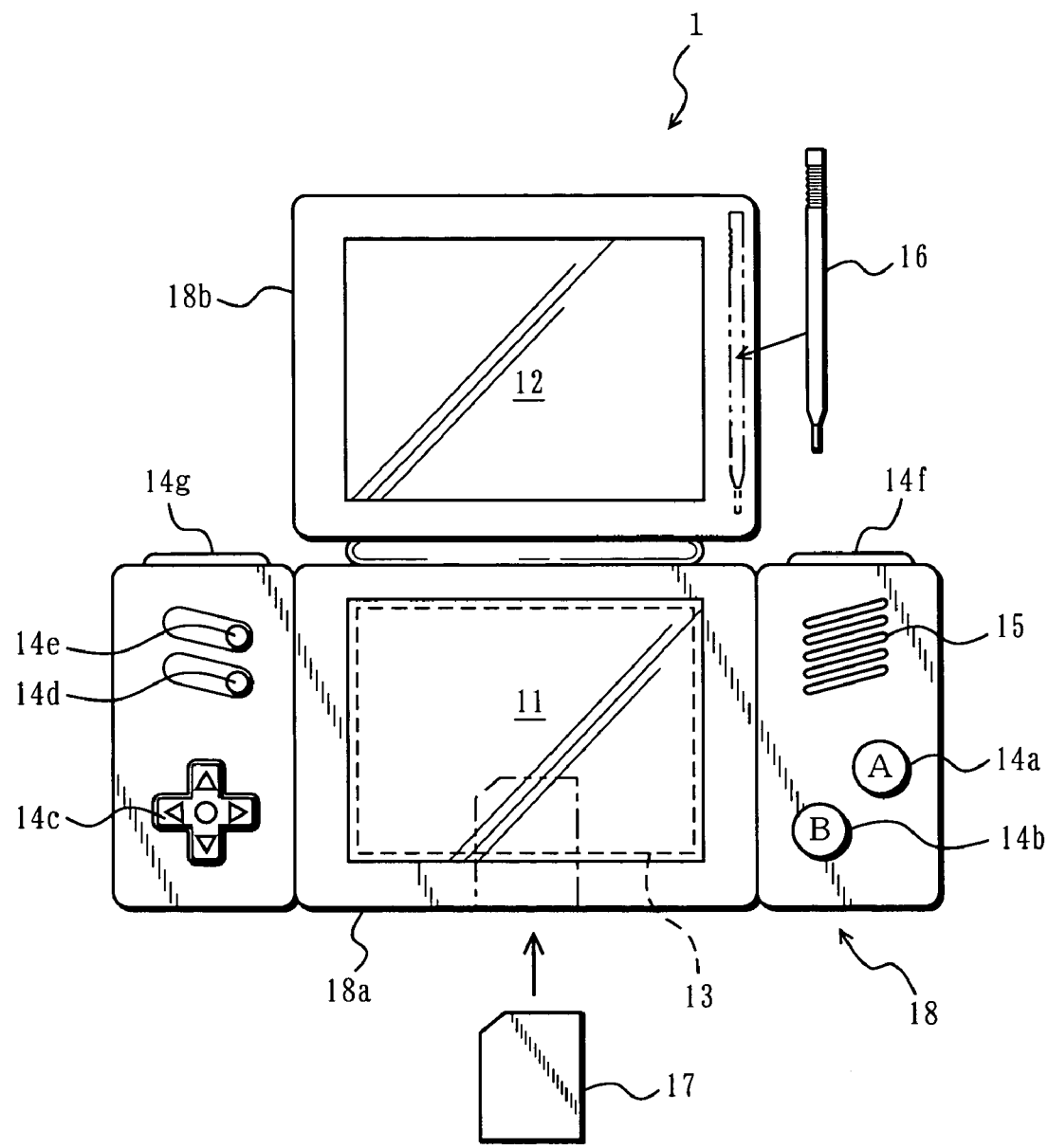
FIG. 1 is an illustration showing an external view of a handheld game apparatus which is one example of an information processing device according to one embodiment of the present invention.

FIG. 1 is an illustration showing an external view of a handheld game apparatus which is one example of the information processing device according to one embodiment of the present invention. In FIG. 1, a game apparatus 1 of the present embodiment is structured so that two liquid crystal displays 11 and 12 (herein after, referred to as "LCDs") are housed in a housing 18 so as to be located at respective predetermined positions. Specifically, in the case where the first LCD 11 and the second LCD 12 are located at lower and upper positions, respectively, the housing 18 is composed of a lower housing 18a and an upper housing 18b. The upper housing 18b is rotatably supported by a portion of the upper side of the lower housing 18a. The upper housing 18b having a planar shape which is somewhat larger than a planar shape of the second LCD 12 is provided with an opening so that a display screen of the second LCD 12 is exposed from one principal surface. The lower housing 18a is provided with an opening in the approximate center thereof so that a display screen of the first LCD 11 is exposed. A planar shape of the lower housing 18a is structured so as to be vertically oriented compared to the upper housing 18b. The lower housing 18a has slits, which are formed on one side of the first LCD 11 to provide for a loudspeaker 15, and operation switches 14 on either side of the first LCD 11.

The operation switches 14 include movement switches 14a and 14b, which are provided on the right side of the first LCD 11 on one principal surface of the lower housing 18a, a direction switch 14c provided on the left side of the first LCD 11 on one principal surface of the lower housing 18a, a start switch 14d, and a select switch 14e. The movement switches 14a and 14b are used for inputting an instruction to jump, punch, or use a weapon, for example, in an action game, and used for inputting an instruction to acquire an item or select/determine a weapon or a command, for example, in a role playing game (RPG) and a simulation RPG, etc. The direction switch 14c is used for determining a direction in a game screen such as a traveling direction of a player object (or a player character) operable by the player (user) and a traveling direction of a cursor, for example. Also, if necessary, an additional movement switch may be provided, and side switches 14f and 14g may be provided on both right and left on the top (upper side) surface of the lower housing 18a on which the operation switches 14 are provided.

Also, a touch panel 13 (an area indicated by a dashed line in FIG. 1) is provided on a top surface of the first LCD 11. The touch panel 13, which may be any one of a resistive film touch panel, an optical (infrared) touch panel, and an electrostatic capacitance coupling touch panel, outputs coordinate data by detecting a location of coordinates of a stylus 16 when a depression operation, a drag operation, or a stroke operation is performed for a top surface (input surface) thereof by the stylus 16 (or a finger).

A storage hole (an area indicated by a chain double-dashed line in FIG. 1) for storing the stylus 16 used for operating the touch panel 13 if necessary is formed near the edge of the upper housing 18b. This storage hole stores the stylus 16. A cartridge insertion section (indicated by an alternate long and short dashed line in FIG. 1) is formed in a portion of the side of the lower housing 18a for removably inserting a cartridge 17 in which a memory (e.g., a ROM) storing a game program such as the graphics identification program according to the present embodiment is stored. The cartridge 17 is an information storage medium for storing a game program, and a nonvolatile semiconductor memory such as a ROM or a flash memory is used as the cartridge 17. A connector (see FIG. 2) for electrical connection with the cartridge 17 is built in the cartridge insertion section. Further, an electronic circuit board containing various electronic components such as a CPU, etc. is housed in the lower housing 18a (or upper housing 18b). Note that the information storage medium for storing a game program is not limited to the above-described nonvolatile semiconductor memory, and may be a CD-ROM, a DVD, or an optical disk storage medium of a similar type.

Figure 2:
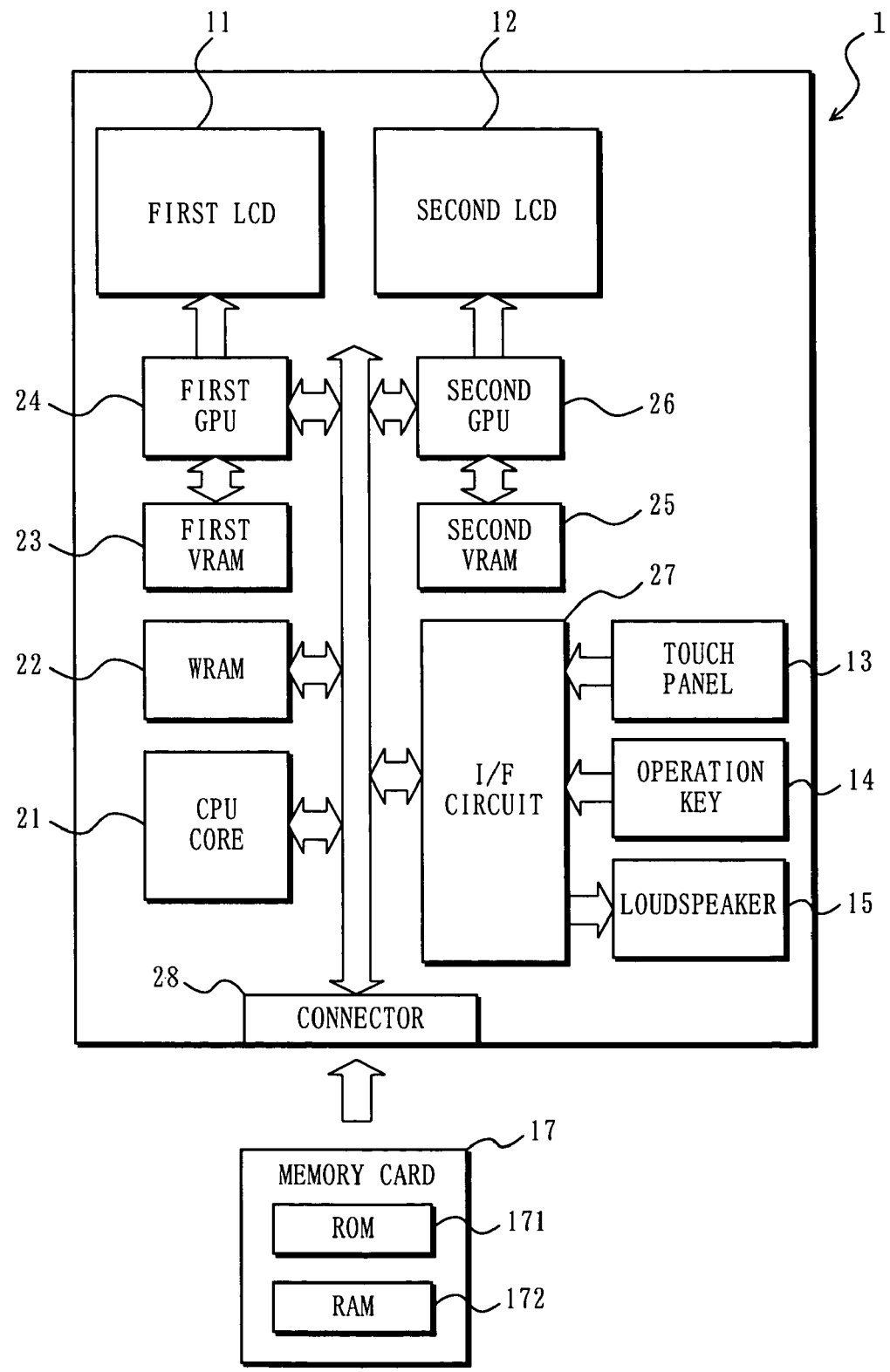
FIG. 2 is a block diagram showing an internal structure of a game apparatus 1.

Next, with reference to FIG. 2, an internal structure of the game apparatus 1 will be described. FIG. 2 is a block diagram showing the internal structure of the game apparatus 1.

In FIG. 2, the electronic circuit board housed in the lower housing 18a contains, for example, a CPU core 21 functioning as a computer. Via a predetermined bus, a connector 28 for connection with the cartridge 17, an input/output interface (I/F) circuit 27, a first graphics processing unit 24 (first GPU), a second graphics processing unit 26 (second GPU), and a working RAM 22 (WRAM) are connected to the CPU core 21.

The cartridge 17 is removably connected to the connector 28. As described above, the cartridge 17 is a storage medium for storing a game program. Specifically, the cartridge 17 contains a ROM 171 for storing a game program and a RAM 172 for rewritably storing backup data. The game program stored in the ROM 171 of the cartridge 17 is loaded to the WRAM 22, and the game program loaded to the WRAM 22 is executed by the CPU core 21. Temporary data obtained by execution of the game program by the CPU core 21 and data for generating an image are stored in the WRAM 22.

The touch panel 13, the operation switches 14, and the loudspeaker 15 are connected to the I/F circuit 27. The loudspeaker 15 is located behind the above-described slits.

A first video RAM 23 (herein after, referred to as "first VRAM") is connected to the first GPU 24, and a second video RAM 25 (herein after, referred to as "second VRAM") is connected to the second GPU 26. In response to an instruction from the CPU core 21, the first GPU 24 generates a first game image based on the image generation data stored in the WRAM 22. The generated first game image is rendered on the first VRAM 23 by the first GPU 24. In response to an instruction from the CPU core 21, the second GPU 26 generates a second game image based on the image generation data stored in the WRAM 22. The generated second game image is rendered on the second VRAM 25 by the second GPU 26.

The first VRAM 23 is connected to the first LCD 11, and the second VRAM 25 is connected to the second LCD 12. The first GPU 24 outputs the first game image rendered on the first VRAM 23 in response to the instruction from the CPU core 21 to the first LCD 11. The first LCD 11 displays the first game image output from the first GPU 24. The second GPU 26 outputs the second game image rendered on the second VRAM 25 in response to the instruction from the CPU core 21 to the second LCD 12. The second LCD 12 displays the second game image output from the second GPU 26.

Hereinafter, a game process executed in the game apparatus 1 by the game program stored in the cartridge 17 will be described. Note that, in the present embodiment, a case in which the graphics identification program according to the present invention is executed by the game apparatus as a game program will be described. Also, in the present embodiment, only the LCD 11 whose display screen is covered by the touch panel 13 is used as a display device. Thus, the game apparatus 1 may not include the second LCD 12.

Hereinafter, a process executed by the graphics identification program according to the present embodiment will be described. The process is performed for identifying a correspondence between a shape of a trace on an input surface of the touch panel 13 (display screen of the first LCD 11) drawn by the user and one of a plurality of reference graphics which is previously prepared. Note that, herein after, a case in which the user draws a hexagon on the input surface of the touch panel 13 will be described as one example.

Figure 3:
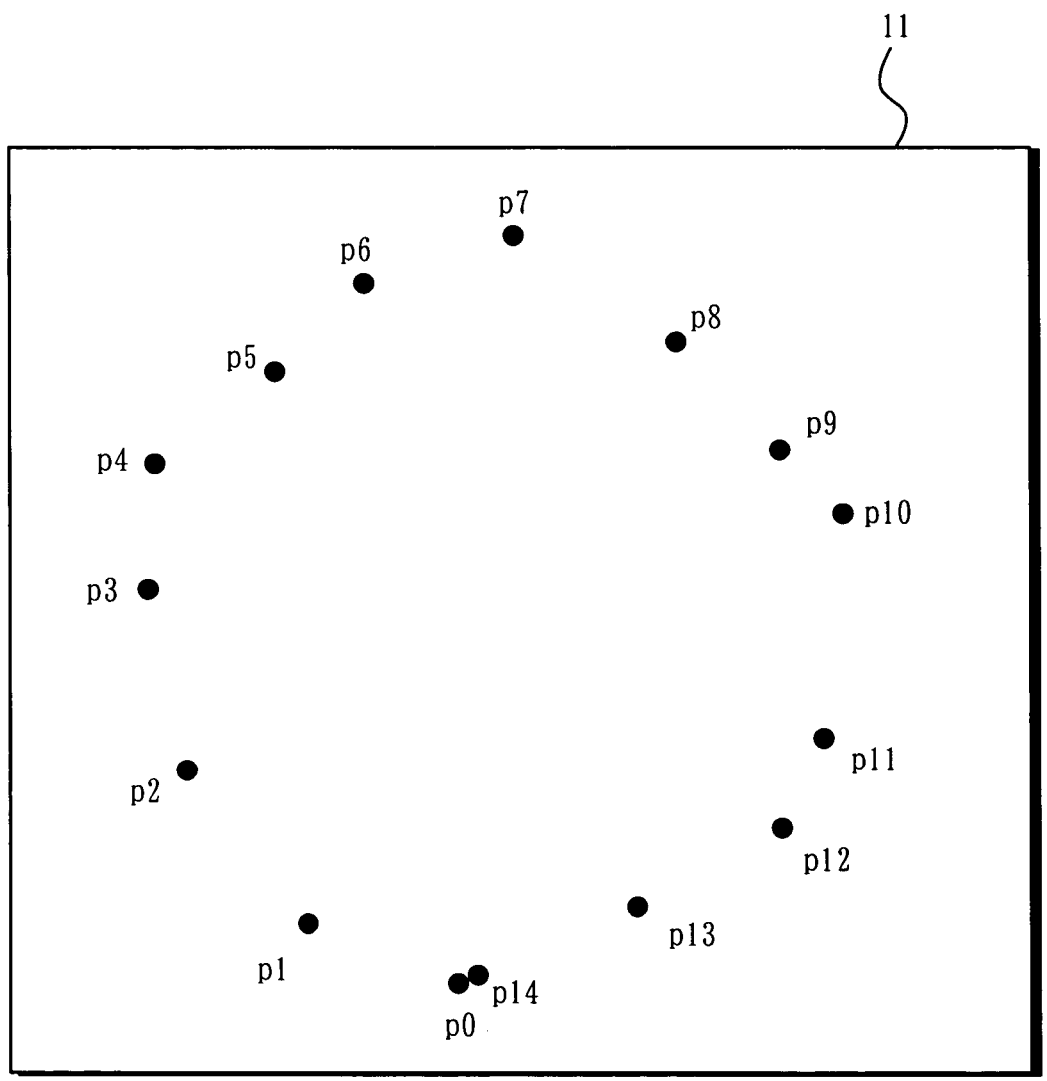
FIG. 3 is an illustration showing one example of an input detected by a touch panel 13.

FIG. 3 is an illustration showing one example of an input detected by the touch panel 13. When the user performs an input for the touch panel 13, the touch panel 13 detects an inputted position at predetermined time intervals in chronological order. The touch panel 13 represents the inputted position by coordinates (X, Y) on a plane whose x- and y-axes correspond to horizontal and vertical directions of the input surface.

Also, a number is assigned to each coordinate point detected by the touch panel 13 in chronological order. That is, a number p (j−1) is assigned to a coordinate point detected $j_{th}$ (j is an arbitrary integer equal to or greater than 1). Note that "number assignment" is used for facilitating the understating of the embodiment, and a number is not actually assigned to data. That is, on the computer, data about the detected coordinate point is stored in the order corresponding to the address, for example, of a previously reserved storage area, whereby it is possible to find out the order in which the data is stored. Here, in order to conceptually describe that it is possible to find out the order in which the data is stored, the above-described concept of "number assignment" is used. In FIG. 3, fifteen coordinate points are detected, and numbers from p0 to p14 are assigned thereto in the order in which each point is inputted. A graphic obtained by connecting these coordinate points with a straight line in the order in which each point is inputted is subject to identification by the graphics identification program. Hereinafter, in order to facilitate the understanding of the present embodiment, the graphic obtained by connecting the coordinate points detected by the touch panel 13 with a straight line in chronological order (that is, in the order in which each point is inputted) is referred to as a subject graphic. The subject graphic is composed of a set of coordinate points indicating a trace drawn on the input surface of the touch panel 13. That is, the subject graphic represents a trace inputted by the user by a plurality of line segments in order to identify graphic characteristics of the trace drawn on the input surface of the touch panel 13. Note that the subject graphic is a concept for facilitating the understanding of the descriptions of the present embodiment, and it is represented on the computer merely by coordinate point data and data about a distance between coordinate points, for example.

When a subject graphic is detected by the touch panel 13, a line factor is first extracted from the subject graphic. That is, a process for thinning out the coordinate points composing the subject graphic (a thinning-out process) is performed. The thinning-out process is performed for simplifying a shape of the subject graphic by deleting (in other words, "extracting" or "acquiring") some coordinate points from among the coordinate points detected by the touch panel 13. Hereinafter, the thinning-out process will be described using FIGS. 4A to 4D.

Figures 4A, 4B:
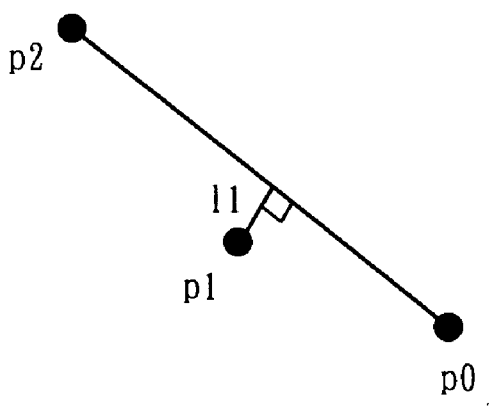
FIGS. 4A to 4D are illustrations for describing a thinning-out process.

FIGS. 4A to 4D are illustrations for describing the thinning-out process. The thinning-out process is performed for deleting a coordinate point lying within a predetermined distance from a straight line connecting two predetermined coordinate points from among a group of coordinate points detected by the touch panel 13. That is, the thinning-out process is performed by calculating a distance between a straight line, whose endpoints are two coordinate points which are not adjacent to each other and are included in the coordinate points composing the subject graphic, and each coordinate points between the above two coordinate points. Specifically, a straight line whose front side endpoint (front endpoint) is a coordinate point p0, which is a starting point of the subject graphic, and whose back side endpoint (back endpoint), which is a coordinate point p2 (a second point after the coordinate point p0), is first selected. Then, a distance l1 between the selected straight line and a coordinate point between the endpoints of the straight line (i.e., a coordinate point p1) is calculated (see FIG. 4A). Further, it is determined whether or not the calculated distance l1 is greater than a predetermined distance (a margin of error) l'. In FIG. 4A, assume that l1<l'. Also, the predetermined distance l' is an arbitrary value appropriately determined based on a type of a graphic to be identified.

As shown in FIG. 4A, in the case where l1 is equal to or smaller than the predetermined distance l', a new straight line is selected, and a distance between the selected straight line and a coordinate point between the endpoints of the straight line. Specifically, a straight line whose back endpoint is shifted to a following coordinate point is newly selected. In an example as shown in FIG. 4A, a straight line connecting the coordinate point p0 and a coordinate point p3 is selected. Then, a distance between the selected straight line and a coordinate point between the endpoints of the straight line is calculated (see FIG. 4B). In an example as shown in FIG. 4B, a distance between a straight line connecting the coordinate points p0 and p3 and a coordinate point between the endpoints of the straight line (each coordinate point between the coordinate points p0 and p3, i.e., coordinate points p0 and p2) is calculated. That is, a distance l1 between the straight line and the coordinate point p1, and a distance l2 between the straight line and the coordinate point p2 are calculated. When the distance l1 and the distance l2 are calculated, it is determined that either the distance l1 or the distance l2 is greater than the margin of error l'. Here, in the case where both the distance l1 and the distance l2 are equal to or smaller than the margin of error l', a new straight line is selected, and a distance between the selected straight line and a coordinate point is calculated. That is, a distance between a straight line connecting the coordinate point p0 and a coordinate point p4 and each coordinate point between the coordinate point p0 and the coordinate point p4 (i.e., each of the coordinate points p1, p2 and p3) is calculated.

On the other hand, in the case where at least either the distance l1 or the distance l2 is greater than the margin of error l', a process for deleting a coordinate point which has been determined to be equal to or smaller than the predetermined distance l' is performed. Specifically, a coordinate point which follows the front endpoint of the currently selected straight line and is at least a second point after the back endpoint of the selected straight line is deleted. In an example as shown in FIG. 4B, a coordinate point which follows the coordinate point p0 and is at least a second point after the coordinate point p3 (i.e., the coordinate point p1) is deleted (see FIG. 4C).

Figure 4C:
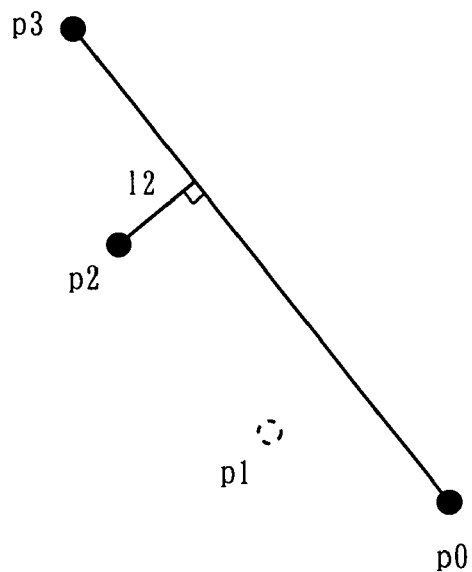

In the case where the coordinate point is deleted as shown in FIG. 4C, a distance between a straight line and a coordinate point is newly calculated. In this case, a straight line whose front endpoint is set to the pre-shifted back endpoint and whose back endpoint is set to a second coordinate point of the pre-shifted front endpoint is selected. Specifically, a straight line connecting the coordinate points p2 and p4 is selected. Then, a distance l3 from the straight line to the coordinate point p3 is calculated (see FIG. 4D). Hereinafter, a process for selecting a straight line and calculating a distance between a coordinate point and the selected straight line, and a process for determining whether or not the calculated distance is greater than a predetermined distance are repeated. In the case where the calculated distance is greater than the predetermined distance, a process for deleting a coordinate point which has been determined to be equal to or smaller than the predetermined distance l' is performed. These processes are performed until a straight line whose back endpoint is set to a coordinate point p14, which is an ending point of the subject graphic, has been selected.

Figure 4D:
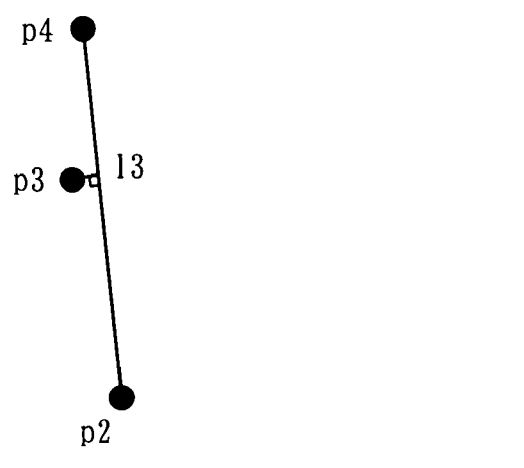
Figure 5:
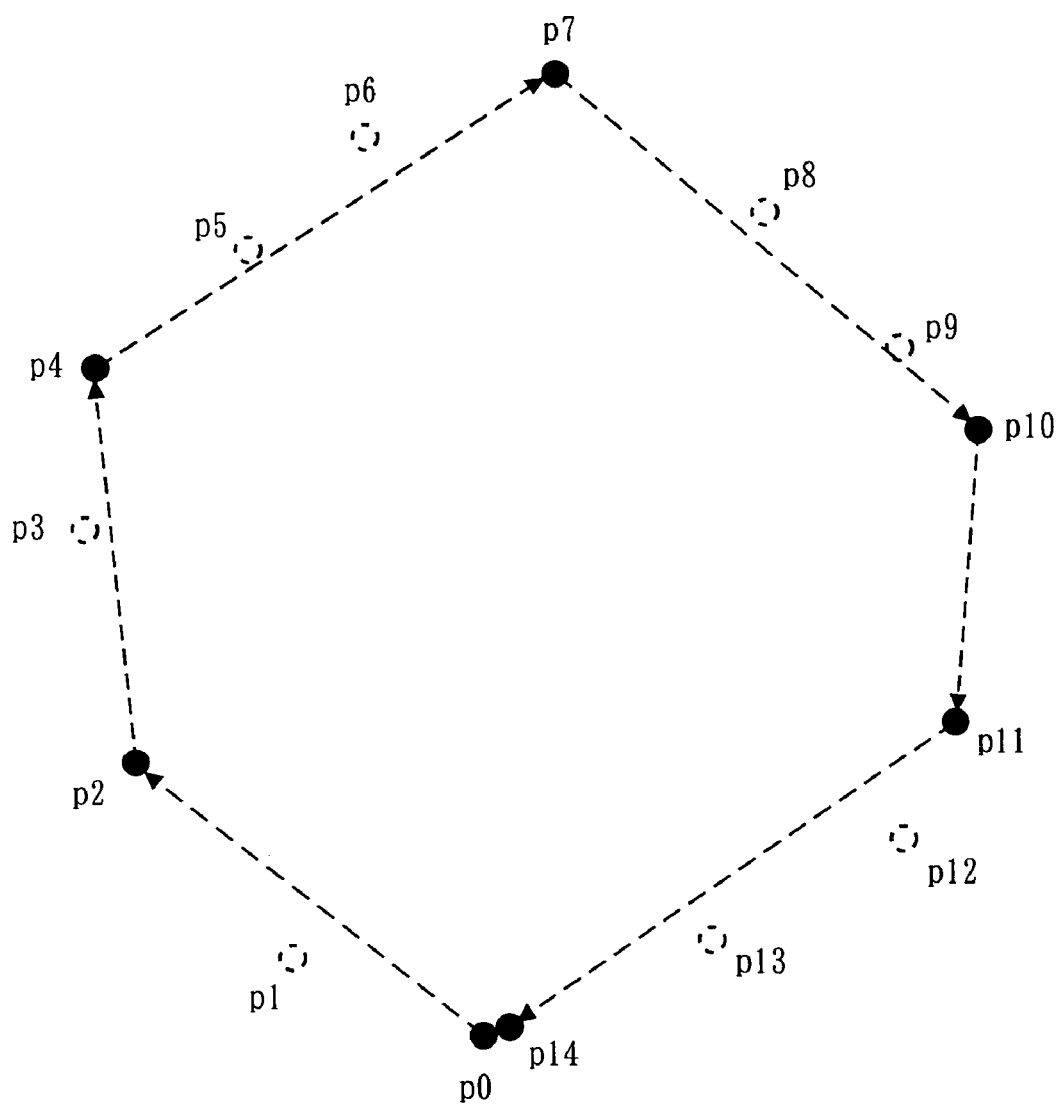
FIG. 5 is an illustration showing before and after states of the thinning-out process.

FIG. 5 is an illustration showing before and after states of the thinning-out process. As shown in FIG. 5, as a result of execution of the thinning-out process as shown in FIGS. 4A to 4D, coordinate points p1, p3, p5, p6, p8, p9, p12, and p13 are deleted. As such, the number of coordinate points composing the subject graphic is changed to seven by the thinning-out process, the number of line segments (coordinate points) composing the subject graphic is reduced, whereby a shape of the subject graphic is simplified. Note that, in the present embodiment, each straight line composing the subject graphic is referred to as a side of the subject graphic. Also, a coordinate point composing the subject graphic is referred to as a vertex of the subject graphic. Note that, in the present embodiment, it is assumed that the thinning-out process is performed by a method as shown in FIGS. 4A to 4D, but any algorithm may be used for thinning out the coordinate points composing the subject graphic. Note that it is possible to simplify a subsequent process by reducing the number of coordinate points as shown in FIG. 4. In the present invention, however, all detected coordinate points may be set to vertices of the graphic.

Figures 6A, 6B:
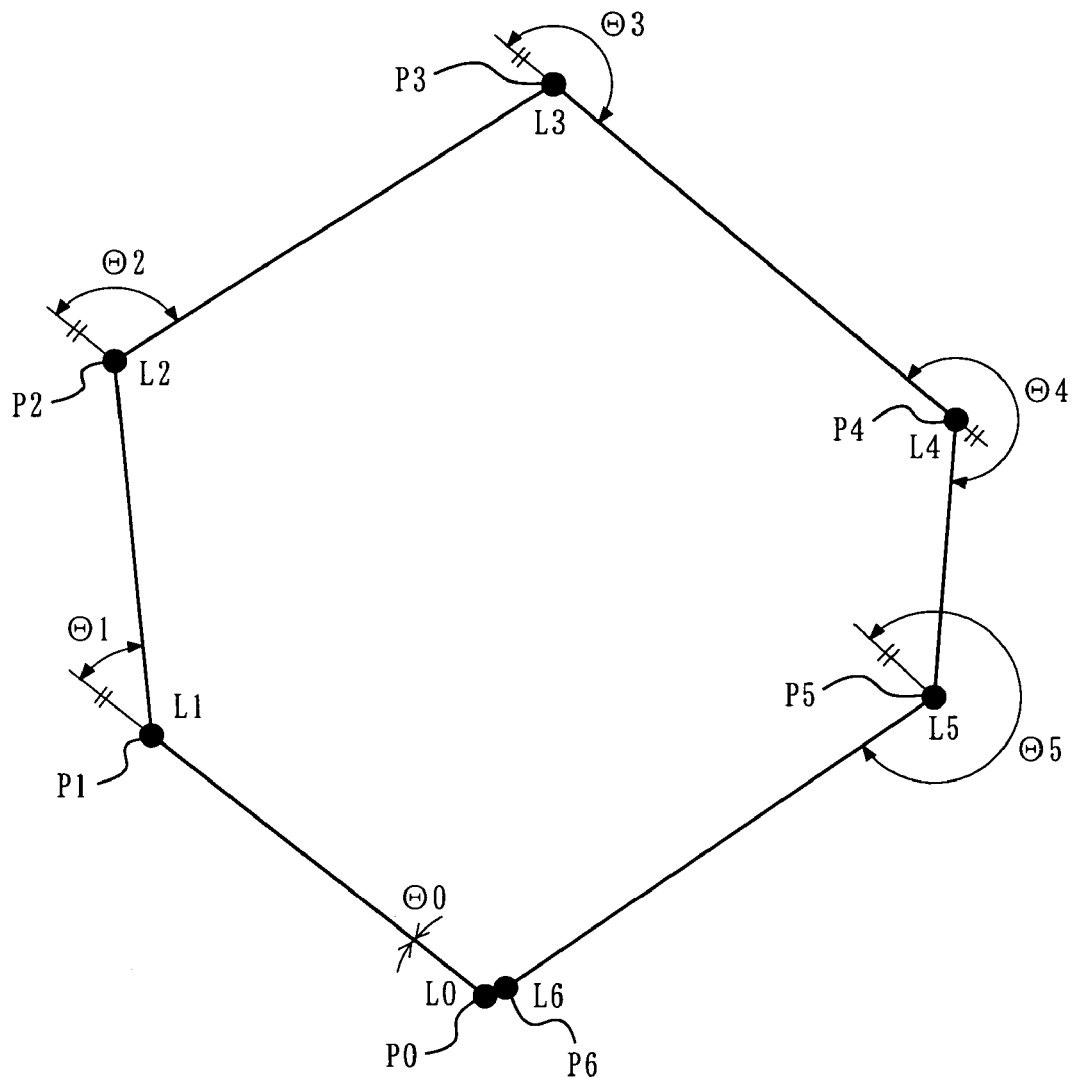
FIGS. 6A and 6B are illustrations showing a subject graphic simplified by the thinning-out process and graphical information thereof.

FIG. 6A is an illustration showing the subject graphic simplified by the thinning-out process. In FIG. 6A, vertices left after the thinning-out process are assigned new vertex numbers P0 to P6, respectively. When the subject graphic is simplified by the thinning out process, graphical information of the simplified graphic is calculated. The graphical information includes a line segment distance of each vertex of the graphic and an absolute angle of each side. The line segment distance corresponds to a distance from a starting point of the subject graphic to each vertex along a line of the graphic. For example, in an example as shown in FIG. 6A, a line segment distance L2 corresponds to the sum of a distance of a straight line connecting the vertex P0 and the vertex P1 and a distance of a straight line connecting the vertex P1 and the vertex P2. Also, a line segment distance L0 of the vertex P0, which is a starting point of the subject graphic, is 0 (L0=0).

Also, the absolute angle corresponds to an angle of each side (line segment) of the subject graphic with respect to a predetermined reference straight line. In the present embodiment, assume that the reference straight line is a side including a starting point of the subject graphic (that is, a line segment connecting the vertex P0 and the vertex P1). That is, the absolute angle is based on an angle (i.e., assuming that it is 0°) of a side including a starting point of the subject graphic (a reference angle, which will be described below). In an example as shown in FIG. 6A, an absolute angle of each of the sides of P0-P1, P1-P2, P2-P3, P3-P4, P4-P5, and P5-P6 is first calculated with respect to a side connecting the vertex P0, which is a starting point of a trace, and the vertex P1. For example, an absolute angle $\Theta 1$ of a side connecting the vertex P1 and the vertex P2 corresponds to an angle which the above side forms with a side including a starting point of the subject graphic (that is, a side connecting the vertex P0 and the vertex P1). Also, an absolute angle is calculated with respect to a side connecting the vertex P0 and the vertex P1, whereby an absolute angle of this side is 0 ($\Theta 0=0$). As such, the game apparatus 1 calculates a line segment distance of each vertex of the subject graphic, and calculates an absolute angle of each side, thereby calculating graphical information of a trace for a trace graph in which an x-axis of orthogonal coordinates indicates a length from a starting point along each side, and a y-axis indicates an absolute angle.

FIG. 6B is an illustration showing one example of graphical information. Note that the graphical information as shown in FIG. 6B is graphical information of the subject graphic as shown in FIG. 6A. As shown in FIG. 6B, the graphical information includes a line segment distance Ln at a vertex Pn of the subject graphic and an absolute angle Θn of a side connecting the vertex Pn and a vertex Pn+1. Note that a value of Θ6 does not exist since there is no side in the case of n=6.

When the above graphical information is calculated, comparison between the subject graphic and the reference graphic is performed. The reference graphic is represented by graphical information of a graphic graph which is previously prepared for graphics identification in the graphics identification program. Here, as is the case with the above-described trace graph, the graphical information is data in which an x-axis of orthogonal coordinates indicates a length from a starting point along each side and a y-axis indicates an absolute angle. The graphics identification program includes data indicating a plurality of types of reference graphics, and the game apparatus 1 identifies a coincidence between a trace drawn by the user on the input surface of the touch panel 13 and one of the plurality of reference graphics. Note that the graphics identification program includes the above graphical information as data indicating the reference graphic. Comparison between the subject graphic and the reference graphic is performed using the graphical information. That is, the game apparatus 1 calculates a degree of similarity between the subject graphic and each reference graphic using the line segment distance and the absolute angle. As a result, a shape of the subject graphic is identified to be a shape of a reference graphic having a high degree of similarity.

Figure 7:
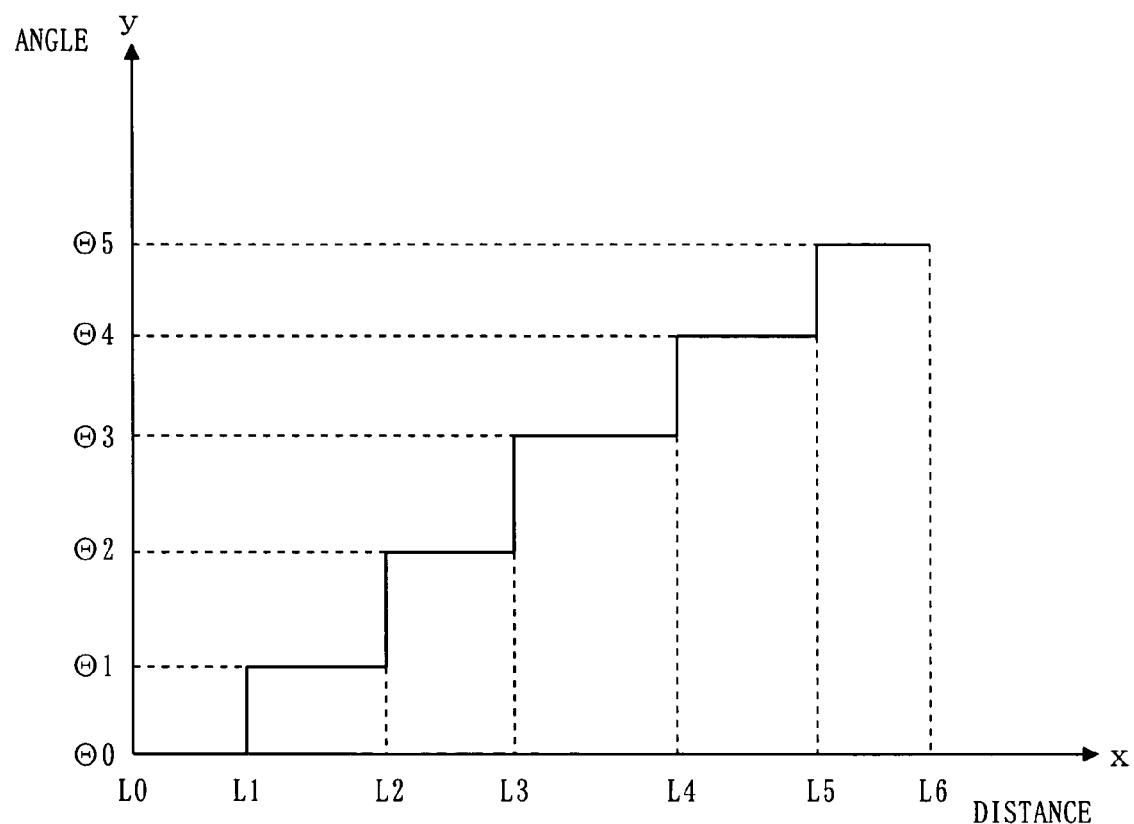
FIG. 7 is an illustration showing one example of a trace graph.

In the present embodiment, comparison between the subject graphic and the reference graphic is performed using a step graph in the orthogonal coordinate system whose axes represent the above line segment distance and the absolute angle. FIG. 7 is an illustration showing one example of a step graph (trace graph) representing the subject graphic. In a coordinate plane as shown in FIG. 7, an x-axis indicates a line segment distance and a y-axis indicates an absolute angle. The trace graph as shown in FIG. 7 indicates characteristics of the subject graphic as shown in FIGS. 6A and 6B. Specifically, a line segment connecting the vertex P0 and the vertex P1 as shown in FIG. 6A corresponds to a line segment x=L0–L1 as shown in FIG. 7. The graph as shown in FIG. 7 indicates that a length of a side leading from a starting point (x=L0) to a coordinate x=L1 is L1–L0 and an absolute angle thereof is y=Θ0 (=0). Also, the graph as shown in FIG. 7 indicates a length of a side leading from a vertex (vertex P1) whose distance from the starting point is L1 to a vertex (vertex P2) whose distance from the starting point is L2 is L2–L1 and an absolute angle thereof is y=Θ1. As shown in FIG. 7, it is possible to represent characteristics of the subject graphic by the trace graph.

Figures 8A, 8B:
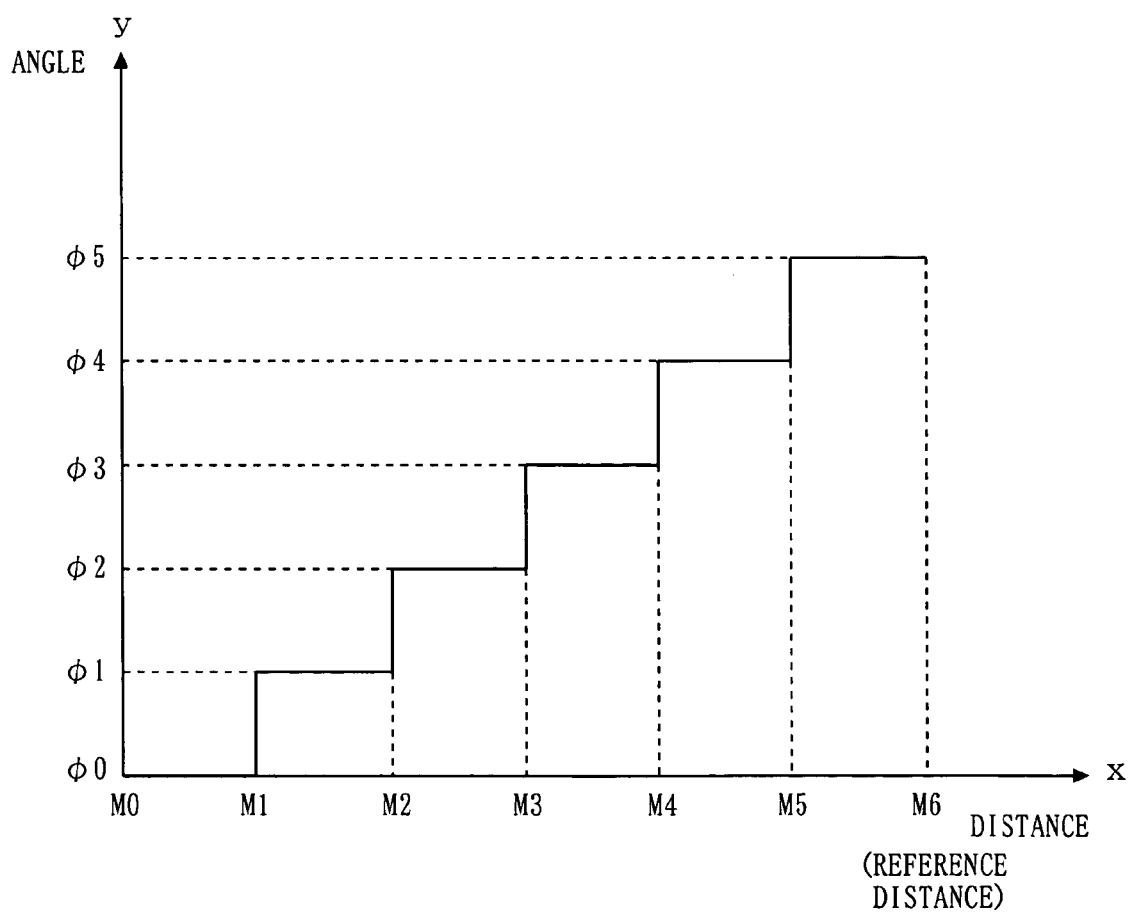
FIGS. 8A and 8B are illustrations showing one example of graphical information of a reference graphic and a graph of the reference graphic, respectively.

On the other hand, as is the case with the subject graphic, it is possible to represent a reference graphic as a graph in the orthogonal coordinate system whose axes are a line segment distance and an absolute angle. FIGS. 8A and 8B are illustrations showing one example of graphical information of a reference graphic and a graph of the reference graphic, respectively. FIG. 8A is an illustration showing graphical information of the reference graphic. Note that the graphical information as shown in FIG. 8A represents a line segment distance Mm of each vertex Qm (m=1 to 6) of the reference graphic and an absolute angle φm of a side connecting the vertex Qm and a vertex Qm+1. As is evident from the graphical information, the reference graphic as shown in FIG. 8A is a regular hexagon, each side having the same length (60).

Also, the reference graphic graph as shown in FIG. 8B represents characteristics of the reference graphic indicated by the graphical information as shown in FIG. 8A. Note that the graphical information of each reference graphic is previously prepared so that a line segment distance of an ending point of the reference graphic becomes a predetermined reference distance. That is, a line segment distance of an ending point of each reference graphic is previously adjusted so as to be the same. As shown in FIG. 8B, as is the case with the subject graphic, it is possible to represent characteristics of the reference graphic by calculating a line segment distance and an absolute angle.

Figure 9:
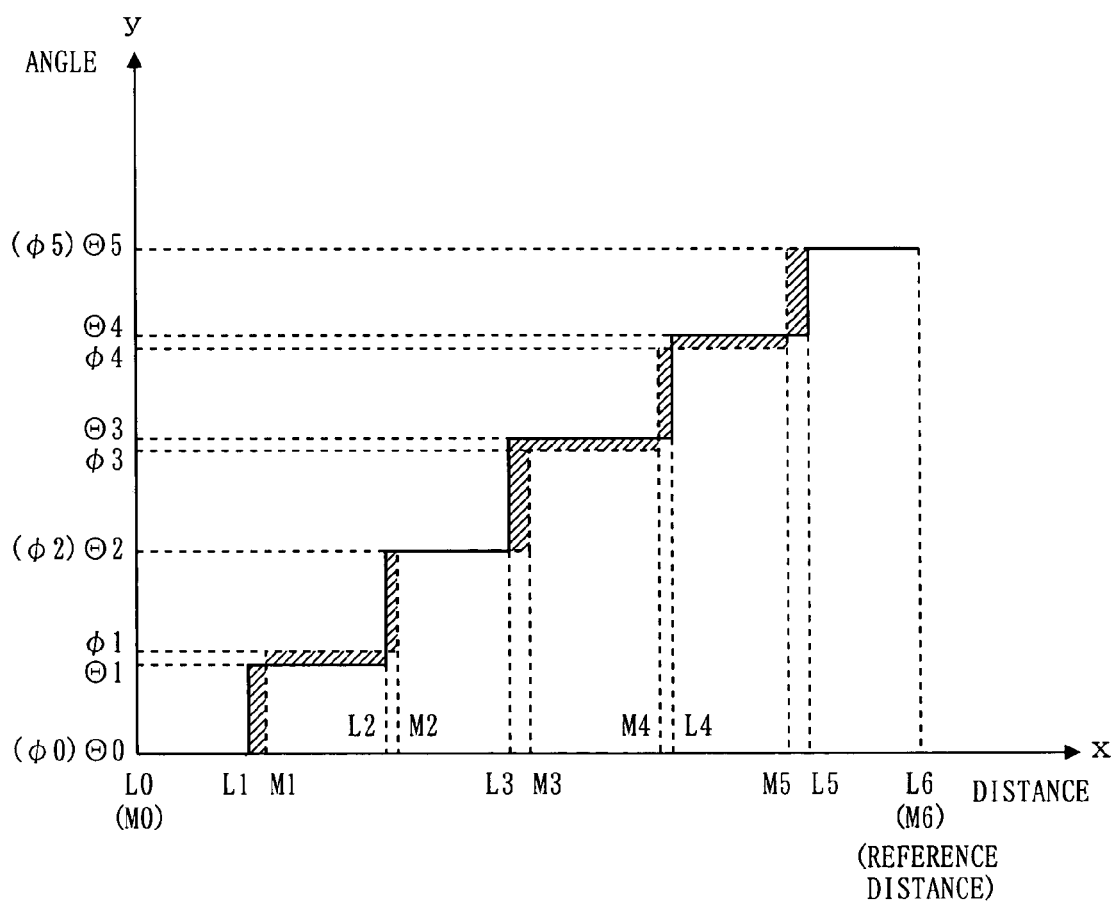
FIG. 9 is an illustration for describing a process for comparing a subject graphic with a reference graphic.

Comparison between the subject graphic and the reference graphic is performed by comparing the trace graph and the reference graphic graph. FIG. 9 is an illustration for describing a process for comparing the subject graphic with the reference graphic. FIG. 9 is an illustration generated by superimposing the trace graph as shown in FIG. 7 on the reference graphic graph as shown in FIG. 8B. In the case where the trace graph is superimposed on the reference graphic graph, the game apparatus 1 calculates the area of portions (shaded portions as shown in FIG. 9) each of which is surrounded by line segments which are not shared by the trace graph and the reference graphic graph. Note that, herein after, the above area is referred to as a difference area. In the present embodiment, the calculated difference area is used as a degree of similarity. That is, in the case where the trace graph and the reference graphic graph are similar in shape, the difference area is reduced, whereby it is possible to determine that there is a high degree of similarity between the two graphs. On the contrary, in the case where the trace graph is completely different from the reference graphic graph in shape, the difference area is increased, whereby it is possible to determine that there is a low degree of similarity between the two graphs. Thus, the game apparatus 1 calculates a difference area with respect to each reference graphic, and identifies that a shape of the reference graphic whose calculated difference area is the smallest is a shape of the subject graphic. Note that, when the trace graph is superimposed on the reference graphic graph, a cumulative length of the subject graphic is normalized so that a cumulative length of the trace graph is equal to a cumulative length of the reference graphic. Here, the cumulative length is a total sum of lengths of the line segments composing a graphic, that is, a line segment distance of an ending point of the graphic. In the examples as shown in FIGS. 7 to 9, the cumulative length is normalized so that the cumulative length (line segment distance L5) of the line segments composing the subject graphic becomes 360. As a result, it is possible to perform graphics identification regardless of the size of the trace inputted by the user.

As such, according to the present embodiment, graphical information (a line segment distance and an absolute angle) of the subject graphic and the reference graphic is calculated. Then, a degree of similarity between the subject graphic and the reference graphic is determined by using a trace graph and a reference graphic graph, which are generated based on the calculated graphical information. That is, a degree of similarity between the subject graphic and the reference graphic is determined based on the area (difference area) of portions which are not shared by the graphs each indicating the corresponding graphic. As a result, a degree of similarity between the subject graphic and the reference graphic is determined in view of various factors such as an angle of each side, a line segment distance of each vertex, the number of vertices, a length of each side, and an input order of each side.

Here, in the case where identification of a complicated graphic is performed, the number of vertices of the subject graphic may differ from the number of vertices of the reference graphic due to false detection by the touch panel 13 or incorrect input by the user, for example. Also, there may be a possibility that some algorithms of the thinning-out process cannot calculate the number of vertices of the subject graphic with accuracy. Note that, in the conventional method by which a degree of similarity between the subject graphic and the reference graphic is determined by using the number of vertices, it may be determined that a degree of similarity is low if the subject graphic and the reference graphic are different in the number of vertices. Thus, it is impossible to identify a shape of the subject graphic of complicated shapes by the conventional method. On the other hand, according to the present embodiment, various factors are considered in order to determine a degree of similarity between the subject graphic and the reference graphic. As a result, a degree of similarity does not substantially change depending only on the number of vertices of the subject graphic. Thus, even if the subject graphic and the reference graphic are different in the number of vertices, it is possible to identify a shape of the subject graphic with accuracy.

Figure 10:
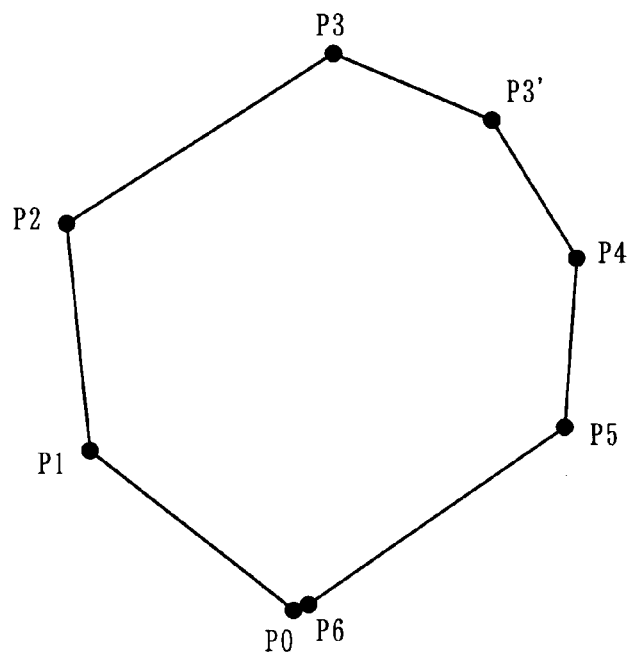
FIG. 10 is an illustration showing one example of a subject graphic in a case where the subject graphic and a reference graphic are different in the number of vertices.
Figure 11:
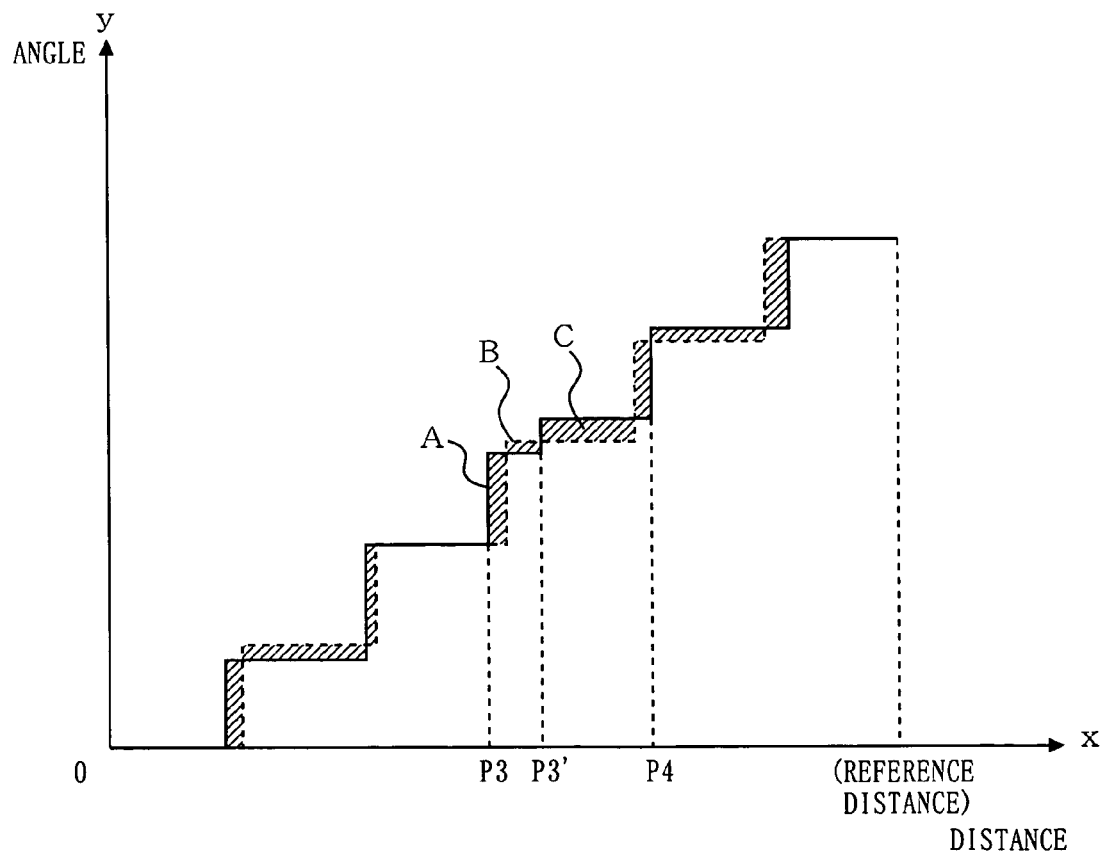
FIG. 11 is an illustration showing a graph of the subject graphic as shown in FIG. 10 and a graph of a reference graphic.

FIG. 10 is an illustration showing one example of a subject graphic in a case where the subject graphic and a reference graphic are different in the number of vertices. The subject graphic as shown in FIG. 10 has a vertex P3' between the vertex P3 and the vertex P4 in addition to the vertices of the subject graphic as shown in FIG. 6A. In the case where the subject graphic is a graphic as shown in FIG. 10, by the conventional method by which a degree of similarity between the subject graphic and the reference graphic is determined by using the number of vertices, it is determined that the number of vertices is seven due to detection of the vertex P3'. As a result, there is a possibility that the subject graphic cannot be appropriately identified to be a hexagon. On the other hand, FIG. 11 is an illustration showing a graph of the subject graphic as shown in FIG. 10 and a reference graphic graph. According to the present embodiment, shaded portions A, B, and C as shown in FIG. 11 appear as a result of detection of the vertex P3'. However, the entirety of the difference area (total area of the shaded portions) does not substantially change by the above shaded portions A to C. That is, the difference area as shown in FIG. 9 is substantially the same as the difference area as shown in FIG. 11. Thus, it is determined that the subject graphic as shown in FIG. 10 has substantially the same degree of similarity as the subject graphic as shown in FIG. 6A. As a result, it is appropriately determined that the subject graphic as shown in FIG. 10 is a hexagon.

Note that, as a method for calculating a difference area, there may be a method using a line graph in which each vertex is connected by a straight line. FIG. 12 is an illustration showing one example of a line graph representing a reference graphic and a subject graphic. By using the line graph as shown in FIG. 12, it is possible to calculate a difference area (shaded portions as shown in FIG. 12). However, in the case where the line graph is used, the calculation amount for calculating a difference area is increased compared to a case in which a step graph is used. Also, a length of each line of the subject graphic and the reference graphic is not considered in the line graph. As a result, the line graph is easily influenced by noise due to false detection by the touch panel 13 and incorrect input by the user, etc. For example, in the case where a vertex (a vertex P' as shown in FIG. 12) which is substantially different from the reference graphic is detected, the line graph is substantially influenced by this vertex. Further, the number of vertices of the subject graphic and the reference graphic is not considered in the line graph, whereby it is difficult to differentiate among a regular triangle, a square, and a regular hexagon, for example. On the other hand, by using the step graph as in the present embodiment, the number of vertices and a length of each side of the reference graphic are considered for determining a degree of similarity, whereby it is possible to identify a graphic with higher accuracy.

Figure 13A:
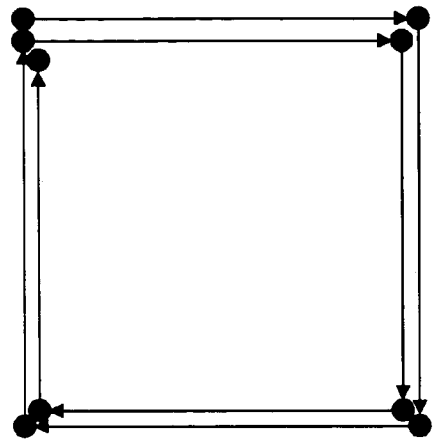
FIGS. 13A and 13B are illustrations showing another example of a reference graphic.
Figure 13B:
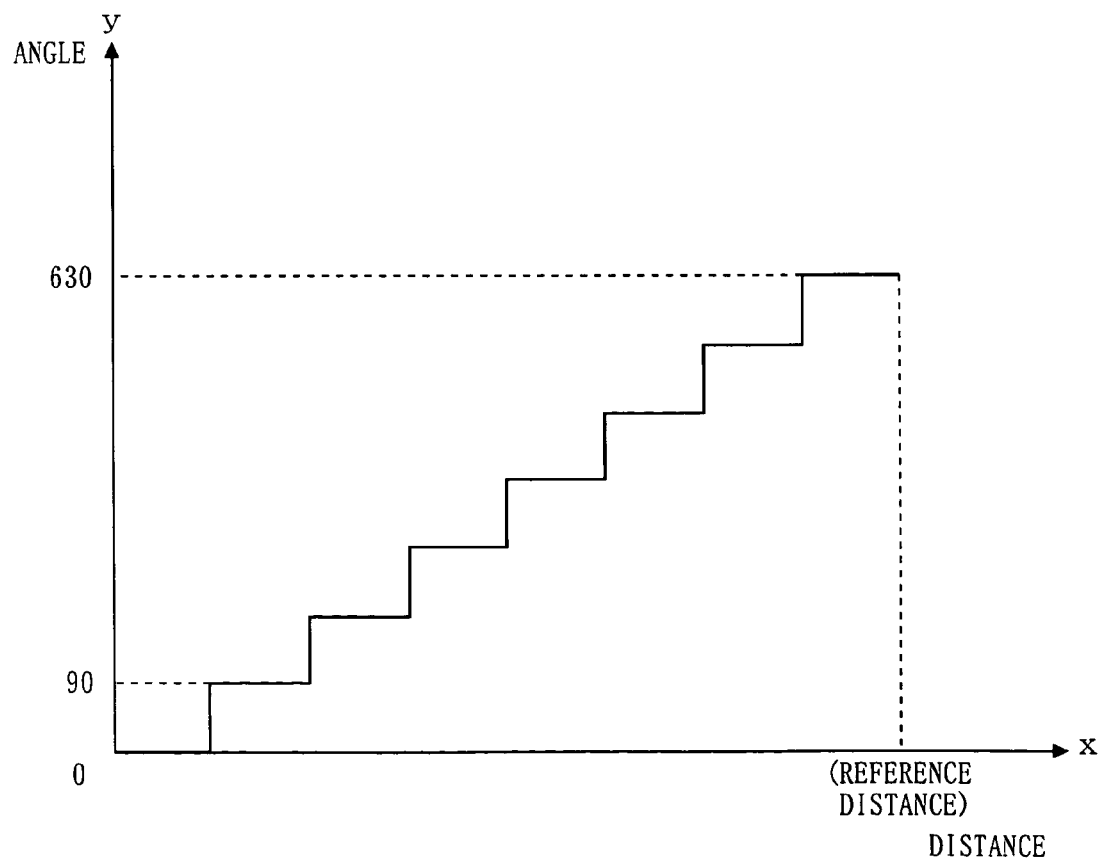
Figure 14A:
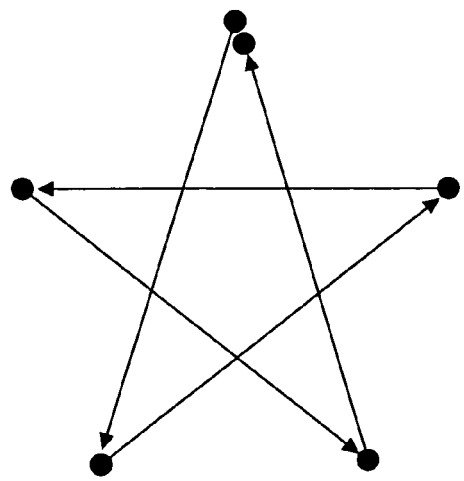
FIGS. 14A and 14B are illustrations showing another example of a reference graphic.
Figure 14B:
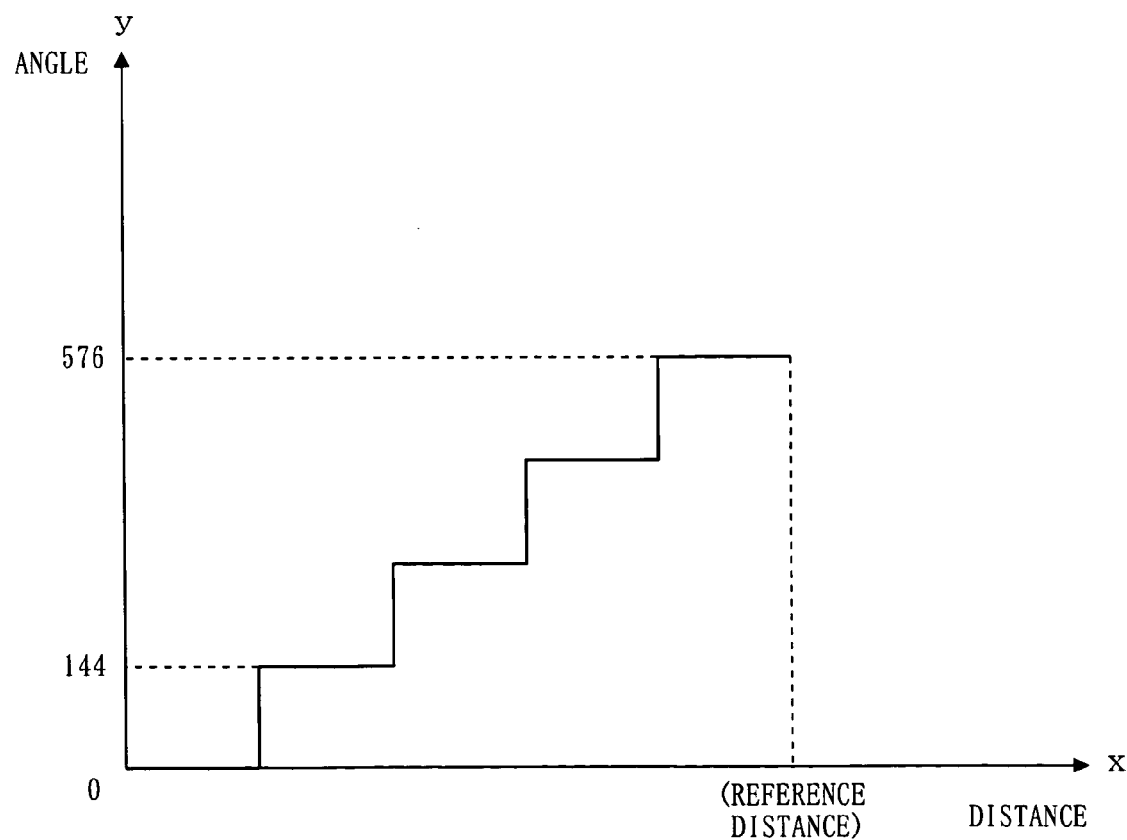
Figure 15A:
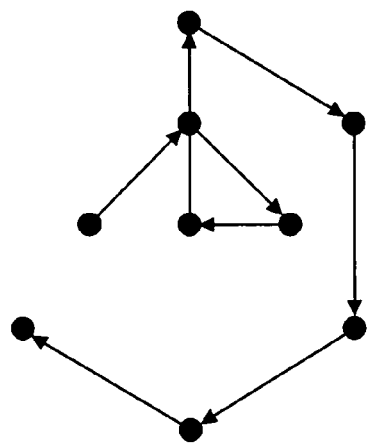
FIGS. 15A and 15B are illustrations showing another example of a reference graphic.
Figure 15B:
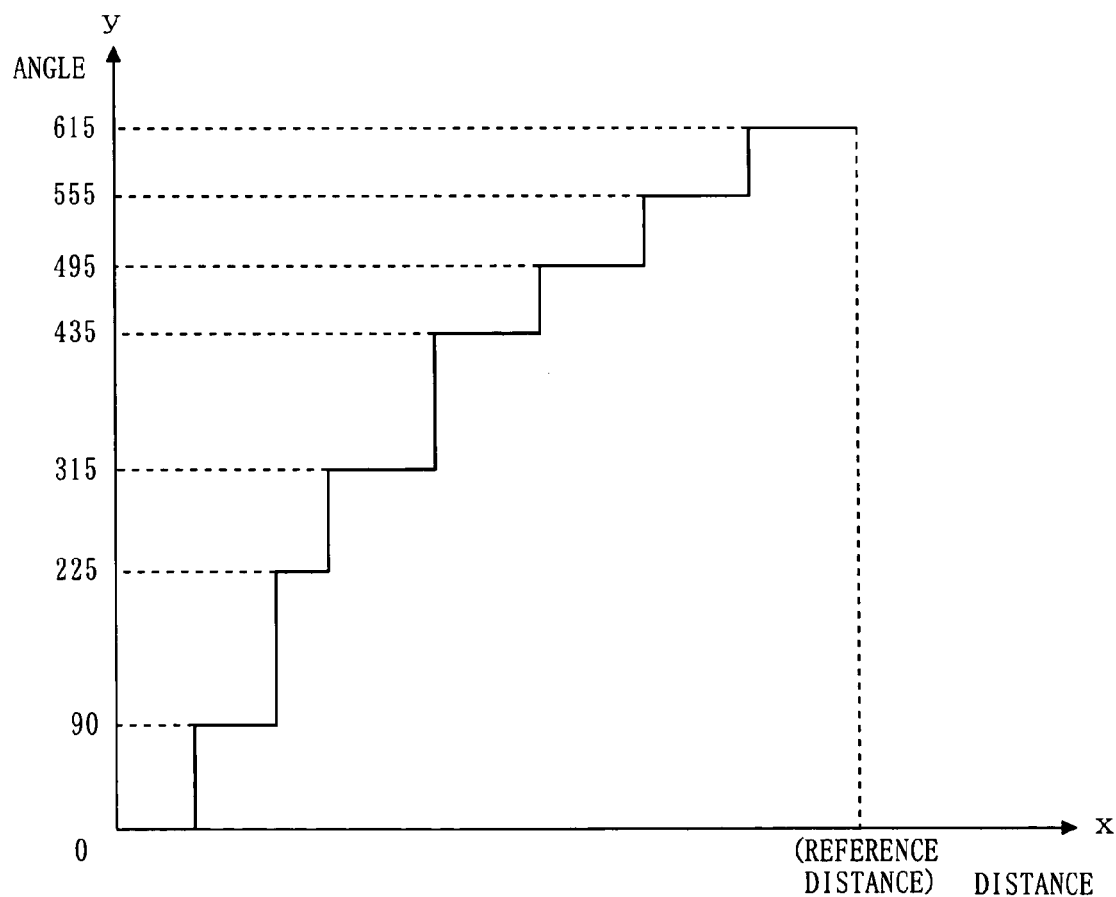

Note that, in the above descriptions, a case in which the reference graphic is a hexagon has been described, but it is possible to handle a case in which a more complicated reference graphic is used by utilizing a step graph. FIGS. 13A, 14A, and 15A are illustrations each showing another example of a reference graphic. According to the present embodiment, it is possible to appropriately represent characteristics of a reference graphic which is a double-framed square as shown in FIG. 13A by utilizing the step graph (see FIG. 13B). Also, by utilizing the step graph, it is possible to appropriately represent characteristics of a star-shaped graphic as shown in FIG. 14A and a complicated graphic as shown in FIG. 15A (see FIGS. 14B and 15B). Thus, even if the user draws the reference graphics as shown in FIGS. 13A, 14A, and 15A, it is possible to appropriately identify a shape of the trace drawn by the user.

Figure 16:
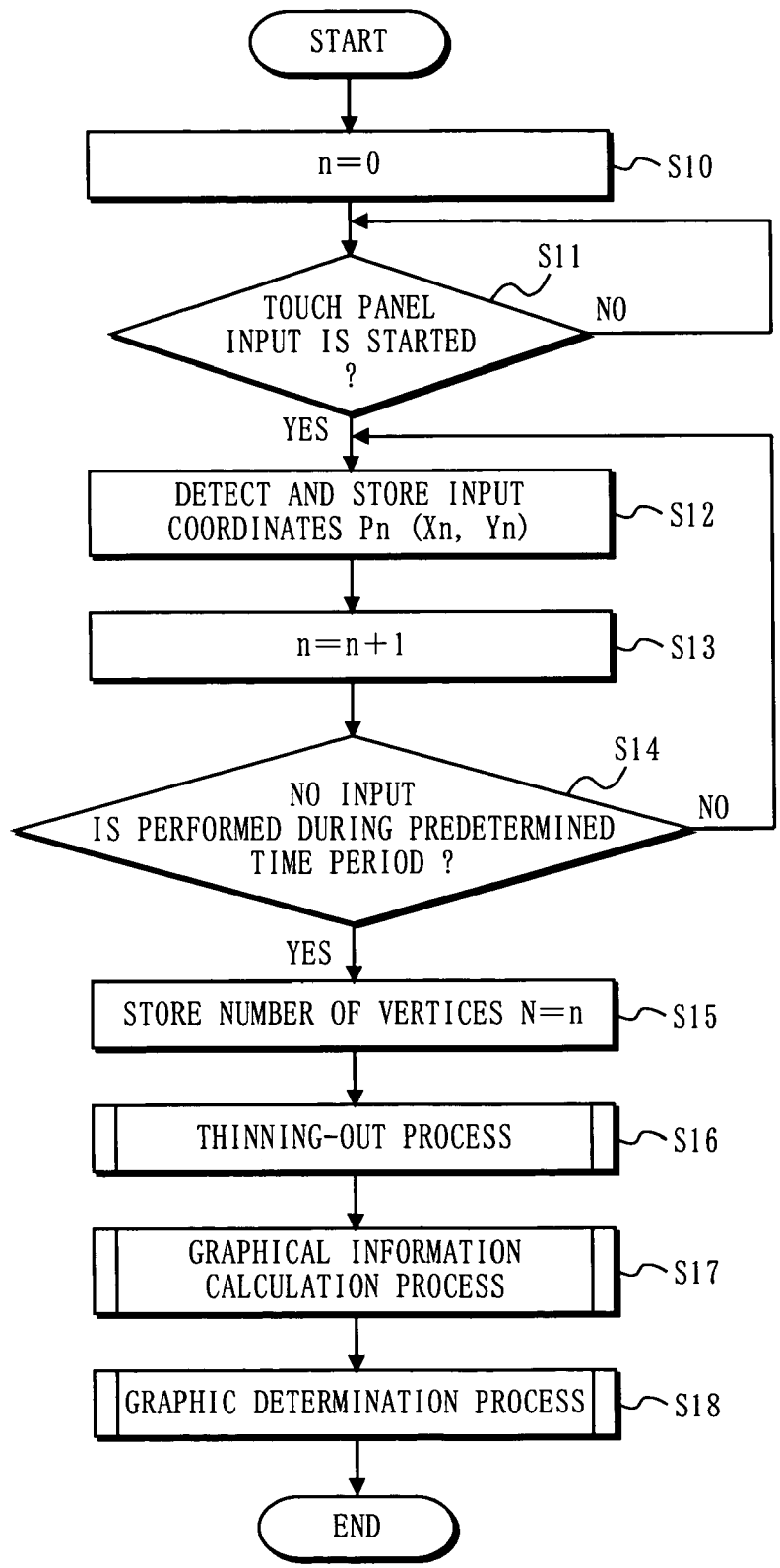
FIG. 16 is a flowchart showing a flow of a graphics identification process executed in the game apparatus 1.

Next, details of a graphics identification process performed by the game apparatus 1 by executing the graphics identification program will be described. FIG. 16 is a flowchart showing a flow of the graphics identification process executed in the game apparatus 1. When power is applied to the game apparatus 1, the CPU core 21 of the game apparatus 1 executes a boot-up program stored in a boot ROM (not shown), whereby each unit such as the WRAM 22 is initialized. Then, a program stored in the cartridge 17 is read to the WRAM 22, and execution of the program is started by the CPU core 21. The flowchart of FIG. 16 shows the graphics identification process which is performed after completion of the above-described process.

In FIG. 16, a value of a counter n is first initialized at step 10 ("step" is abbreviated as "S" in the drawings). That is, the counter n is reset to zero (n=0). This counter n is used for indicating a number of a coordinate point detected as a subject graphic. At the following step 11, it is determined whether or not an input to the touch panel 13 is started. Specifically, it is determined whether or not coordinate data indicating a location of the input is output from the touch panel 13. If it is determined at step 11 that an input to the touch panel 13 is not started, a process at step 11 is repeated. On the other hand, if it is determined at step 11 that an input to the touch panel 13 is started, a process at step 12 is performed. That is, the game apparatus 1 waits for the user to perform an input to the touch panel 13, and proceeds to step 12 when the input is detected.

At step 12, the CPU core 21 detects coordinates of a coordinate point to which an input is performed on the input surface of the touch panel 13, and stores the detected coordinates. Specifically, a coordinate value (X, Y) is read from the touch panel 13, and the read value is stored in the WRAM 22. Note that a coordinate value detected when the counter n=j (j is an integer equal to or greater than 1) is stored as a coordinate value (Xj, Yj) of a coordinate point p (j). At the following step 13, the counter value n is incremented by 1. At the following step 14, it is determined whether or not an input to the touch panel 13 is not detected for a predetermined time period. Specifically, it is determined whether or not coordinate data is not output from the touch panel 13 for a predetermined time period. If it is determined at step 14 that an input to the touch panel 13 is detected during a predetermined time period, the process goes back to step 12. Hereinafter, steps 12 to 14 are repeated until an input to the touch panel 13 is not performed for a predetermined time period. On the other hand, if it is determined at step 14 that an input to the touch panel 13 is not detected during a predetermined time period, a process at step 15 is performed. That is, at step 15, a value indicating the number N of vertices of the subject graphic is stored in the WRAM 22. Specifically, a value N is set to the current value n. As a result, the number of vertices of the subject graphic is determined. By the above-described steps 12 to 15, the coordinate points of the trace drawn on the input surface of the touch panel 13 are detected in chronological order, and the detected coordinate points are stored in the WRAM 22 in chronological order.

At step 16, the above-described thinning out process is performed for the subject graphic detected at step 12 (see FIGS. 4A to 4D). The thinning-out process is performed for thinning out some coordinate points from the coordinate points composing the subject graphic in order to extract a line factor from the subject graphic. Hereinafter, details of the thinning-out process will be described by using FIG. 17.

Figure 17:
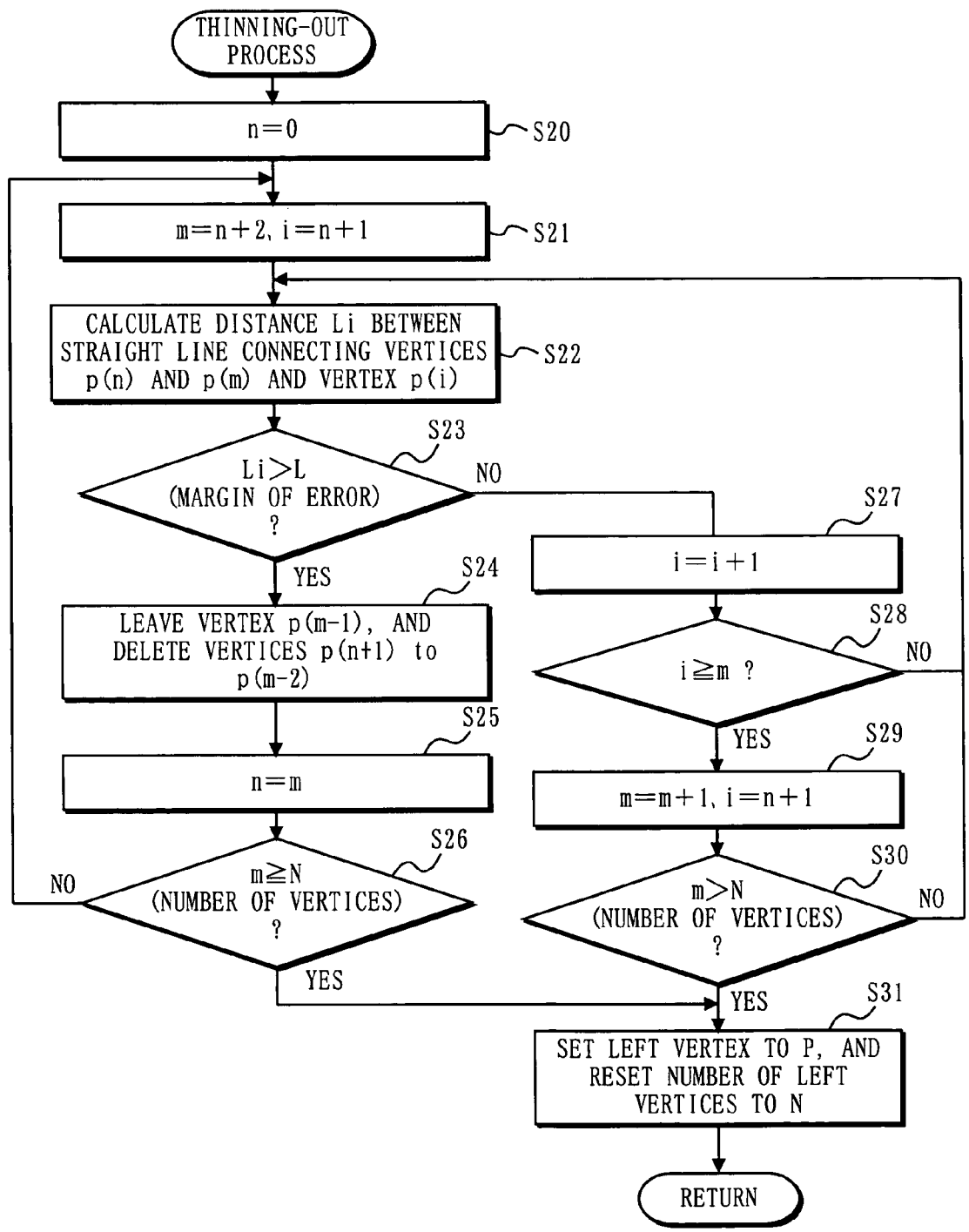
FIG. 17 is a flowchart showing a detailed process flow of step 16 as shown in FIG. 16.

FIG. 17 is a flowchart showing a detailed process flow of step 16 as shown in FIG. 16. In the thinning-out process at step 16, a value of the counter n is first set to zero (n=0) at step 20. In the thinning-out process, the counter n is used for indicating a front endpoint of a straight line when a distance between the straight line and a coordinate point is calculated. At the following step 21, a value of a counter m is set to n+2 (m=n+2), and a value of a counter i is set to n+1 (i=n+1). In the thinning-out process, the counter m is used for indicating a back endpoint of a straight line when a distance between the straight line and a coordinate point is calculated. The counter i is used for indicating a coordinate point when a distance between a straight line and the coordinate point is calculated. A value of the counter n is set at step 20 and a value of the counter m is set at step 21, whereby a straight line based on which a distance to each coordinate point is to be calculated is selected.

At step 22 following step 21, a distance between the currently-selected straight line and a coordinate point lying between the endpoints of the above straight line is calculated. Specifically, a distance l (i) between a straight line whose front endpoint is a coordinate point (coordinate point p (n)) indicated by the counter n and whose back endpoint is a coordinate point (coordinate point p (m)) indicated by the countermand a coordinate point (coordinate point p (i)) is calculated. The above distance l (i) can be calculated by using the following equation (1):

$$l(i)=((Xm-Xn)(Yi-Yn)-(Ym-Yi)(Xi-Xn))^2/((Xm-Xn)^2+(Ym-Yn)^2) \quad (1)$$

At step 23, it is determined whether or not the distance l (i) calculated at step 22 is greater than a margin of error l'. A value of the above margin of error l' is previously determined. If it is determined at step 23 that the distance l (i) is greater than the margin of error l', a process at step 24 is performed. On the other hand, if it is determined at step 23 that the distance l (i) is equal to or smaller than the margin of error l', a process at step 27 is performed.

First, a case in which it is determined at step 23 that the distance l (i) is greater than the margin of error l' will be described. At step 24, a process for deleting a coordinate point is first performed. The coordinate points p (n+1) top (m−2) are deleted by the above process. For example, in the case of n=0, m=3, and i=2, a coordinate point p1 is deleted (see FIG. 4C). Specifically, a coordinate value of the coordinate point p1 is deleted from the WRAM 22. At the following step 25, a value of the counter n is set to a value of the counter m. Further, at step 26, it is determined whether or not a value of the counter m is equal to or greater than the number N of vertices. The process at step 26 is performed for determining whether or not the thinning-out process is performed for a coordinate point p (N), which is an ending point of the subject graphic. If it is determined at the step 26 that a value of the counter m is equal to or greater than the number N of vertices, a process at step 31 is performed. The process at step 31 will be described below. On the other hand, if it is determined at step 26 that a value of the counter m is smaller than the number N of vertices, the process goes back to step 21.

Next, a case in which it is determined at step 23 that the distance l (i) is equal to or smaller than the margin of error l' will be described. First, a value of the counter i is incremented at step 27. At the following step 28, it is determined whether or not a value of the counter i is equal to or greater than a value of the counter m. The value of the counter i equal to or greater than the value of the counter m indicates that a distance between the currently selected straight line and each of all coordinate points laying between the endpoints of the straight line has been calculated. On the contrary, the value of the counter value i smaller than the value of the counter value m indicates that a distance between the currently selected straight line and at least one of the coordinate points lying between the endpoints of the straight line has not yet been calculated. Thus, if it is determined at step 28 that a value of the counter i is smaller than a value of the counter m, a process at step 22 is performed for calculating a distance between the currently selected straight line and an unprocessed coordinate point. On the other hand, if it is determined at step 28 that a value of the counter i is equal to or greater than a value of the counter m, the selected straight line is changed. Specifically, at step 29, a value of the counter m is incremented. Also, at step 29, a value of the counter i is set to n+1 (i=n+1). Further, at the following step 30, it is determined whether or not a value of the counter m is greater than the number N of vertices. A process at step 30 is performed for determining whether or not the thinning-out process is performed for a coordinate point p (N), which is an ending point of the subject graphic. If it is determined at step 26 that a value of the counter m is equal to or smaller than the number N of vertices, the process goes back to step 22. On the other hand, if it is determined at step 26 that a value of the counter m is greater than the number N of vertices, a process at step 31 is performed.

At step 31, a new number is assigned to a coordinate point (vertex) which is left after deletion by the thinning-out process. Specifically, in accordance with the order of input, numbers P0, P1, P2, . . . are assigned to the respective coordinate values of the coordinate points (vertices) left after deletion by the thinning-out process. Note that, in the following graphics identification process, a coordinate value of a vertex Pj (j is an arbitrary integer equal to or greater than 1) is represented as (Xj, Yj). Also, at step 31, a value of the number N of vertices is reset to the number of vertices left after deletion by the thinning-out process. After completion of step 31, the CPU core 21 ends the thinning-out process performed at step 16.

Again in FIG. 16, after step 16, a graphical information calculation process is performed at step 17. The graphical information calculation process is performed for calculating graphical information of the subject graphic, that is, a line segment distance of each vertex and an absolute angle of each side. Hereinafter, details of the graphical information calculation process will be described by using FIG. 18.

Figure 18:
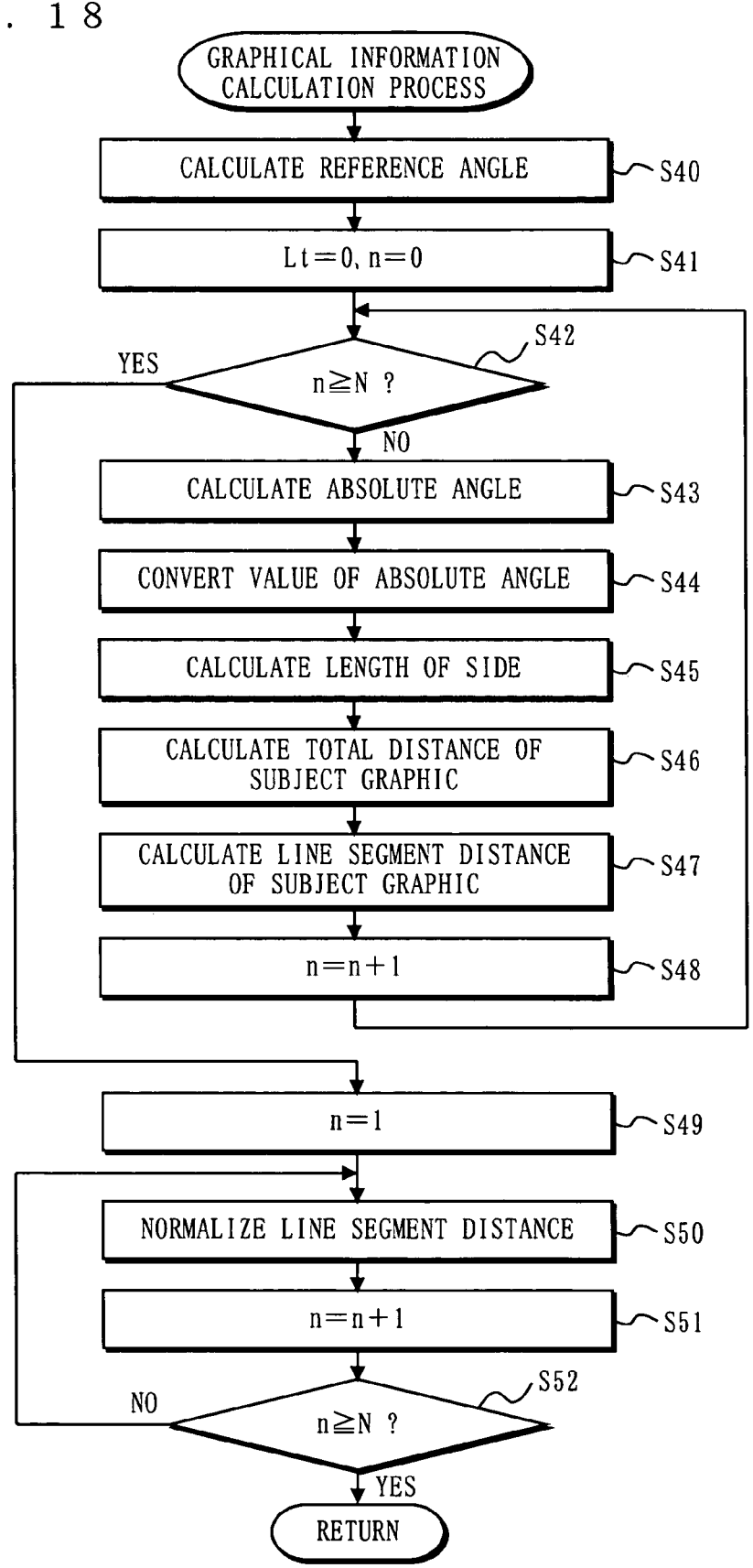
FIG. 18 is a flowchart showing a detailed process flow of step 17 as shown in FIG. 16.

FIG. 18 is a flowchart showing a detailed process flow of step 17 as shown in FIG. 16. In the graphical information calculation process at step 17, a reference angle is first calculated at step 40. The reference angle is used for converting an absolute angle of each side to a value based on the reference angle. Specifically, the reference angle is an angle of the first side of the subject graphic with respect to the normal direction of an x-axis of the input surface. Note that the first side of the subject graphic is a side connecting the vertex P0 and the vertex P1. The reference angle Θ' can be calculated by using the following equation (2), for example:

$$\Theta'=\arctan((Y1-Y0)/(X1-X0)) \quad (2)$$

Next, at step 41, a variable Lt indicating a total sum of lengths of the sides of the subject graphic is set to zero. Further, a counter n is set to zero (n=0). In the graphical information calculation process, the counter n is used for indicating a vertex Pn of the subject graphic. At the following step 42, it is determined whether or not a value of the counter n is equal to or greater than the number N of vertices. Determination at step 42 is performed for calculating a line segment distance of each of all vertices of the subject graphic and determining whether or not an absolute angle of each of all sides is calculated. If it is determined at step 42 that a value of the counter n is equal to or greater than a value of the number N of vertices, a process at step 49 is performed. The process after step 49 will be described below.

On the other hand, if it is determined at step 42 that a value of the counter n is smaller than a value of the number N of vertices, a process at step 43 is performed. That is, at step 43, an absolute angle $\Theta n$ of a side connecting the vertex Pn and the vertex Pn+1 is calculated. Specifically, the absolute angle $\Theta n$ is calculated by using the following equation (3):

$$\Theta n = \arctan((Y(n+1)-Yn)/(X(n+1)-Xn)) \qquad (3)$$

Note that the absolute angle calculated by the equation (3) is calculated with respect to the normal direction of the x-axis of the input surface. Thus, at the following step 44, the value of the absolute angle calculated at step 43 is converted to a value based on the above-described reference angle. That is, the value of the absolute angle $\Theta n$ is converted to a value obtained by subtracting the reference angle $\Theta'$ from the absolute angle $\Theta n$ calculated at step 43.

At step 45 following step 44, a length L'n of a side connecting the vertex Pn and the vertex P (n+1) is calculated. Specifically, the length L'n is calculated by using the following equation (4):

$$L'n = (((X(n+1)-Xn))^2 + ((Y(n+1)-Yn))^2)^{1/2} \qquad (4)$$

At the following step 46, a total distance of the subject graphic is calculated. Specifically, a value of the valuable Lt indicating the total sum of the lengths of the sides of the subject graphic is updated. The value of the valuable Lt is updated so as to become a value obtained by adding L'n to the pre-update value. By repeating the process at step 46 until n=N, the value of the variable Lt finally becomes a value indicating the total sum of the lengths of the sides of the subject graphic, that is, the total distance of the subject graphic. At the following step 47, a line segment distance Ln of the vertex P (n) is calculated by using L'n calculated at step 45. Specifically, a value of Ln is calculated by using the following equation (5):

$$Ln = L'n + L(n-1) \qquad (5)$$

Note that, in the equation (5), a value of L(n-1) has been calculated at the previous step 47. Also, in the case of n=0, calculation is performed on the assumption that L (n-1)=0.

At step 48 following step 47, a value of the counter n is incremented. After step 48, the process goes back to step 42. Hereinafter, steps 42 to 48 are repeated until n-N.

Next, a process after step 49 will be described. First, at step 49, a value of the counter n is set to zero (n=0). At the following step 50, a value of the line segment distance Ln is normalized. Specifically, a value of the line segment distance Ln is converted to a value obtained by multiplying the pre-converted Ln by La/Lt. Note that La is the above-described reference distance. By step 50, a value of the converted L (N) is normalized so as to be La (L(N)=La).

At the following step 51, a value of the counter n is incremented. Further, at the following step 52, it is determined whether or not a value of the counter n is equal to or greater than a value of the number N of vertices. Determination at step 52 is performed for determining whether or not normalization is performed for a line segment distance of each of all vertices of the subject graphic. If it is determined at step 52 that the value of the counter n is smaller than the value of the number N of vertices, the process at step 50 is performed.

Hereinafter, steps 50 to 52 are repeated until n≧N. On the other hand, if it is determined at step 52 that the value of the counter n is equal to or greater than the value of the number N of vertices, the CPU core 21 ends the graphical information calculation process.

Again in FIG. 16, after step 17, a graphic determination process is performed at step 18. The graphic determination process is performed for determining a shape of a graphic based on the identification results.

Figure 19:
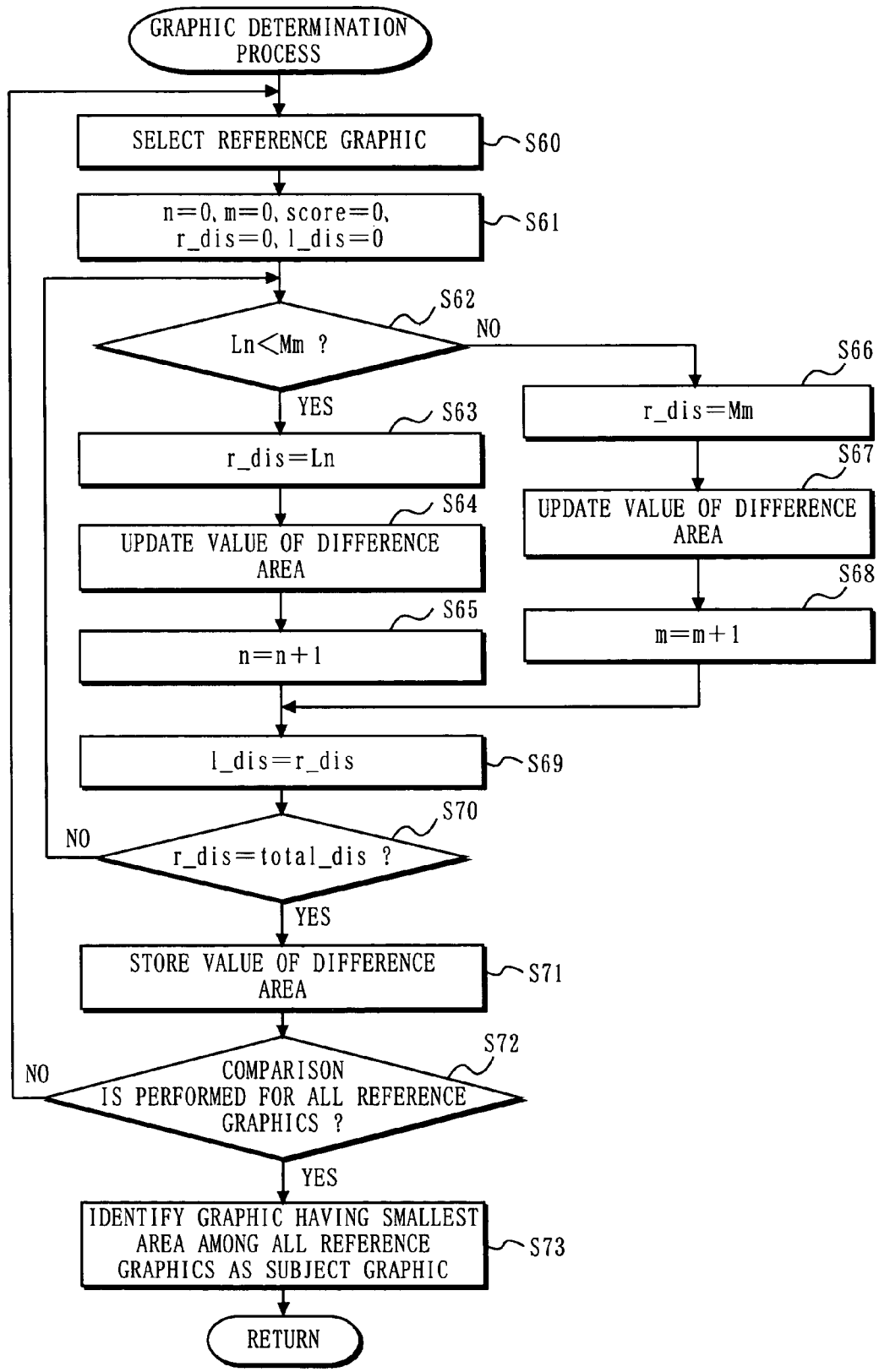
FIG. 19 is a flowchart showing a detailed process flow of step 18 as shown in FIG. 16.

FIG. 19 is a flowchart showing a detailed process flow of step 18 as shown in FIG. 16. In the graphic determination process at step 18, one of the reference graphics previously prepared in the graphics identification program is first selected at step 60, and graphical information of the selected reference graphic is read. Note that, at step 60, one of the reference graphics which have not yet been selected is selected.

At step 61, a value of each variable used in the graphic determination process is initialized. Specifically, a value of each of a counter n, a counter m, a variable S, a variable rd, and a variable ld is set to zero. Note that, in the graphic determination process, the counter n indicates a vertex Pn of the subject graphic. Also, in the graphic determination process, the counter m indicates a vertex Qm of the reference graphic. The variable S is used for calculating a difference area.

At step 62, it is determined whether or not a line segment distance Ln of the vertex Pn of the subject graphic is smaller than a line segment distance Mm of the vertex Qm of the reference graphic. If it is determined at step 62 that the line segment distance Ln is smaller than the line segment distance Mm, a process at steps 63 to 65 is performed. On the other hand, if it is determined at step 62 that the line segment distance Ln is equal to or greater than the line segment distance Mm, a process at steps 65 to 68 is performed.

First, the process at steps 63 to 65 will be described. At step 63, a value of the variable rd is set to Ln (rd=Ln). At the following step 64, a value of the variable S is updated. Specifically, a value of the updated variable S is calculated by the following equation (6):

$$S = S' + |(ld-rd) \cdot (\Theta n - \phi m)| \qquad (6)$$

Note that, in equation (6), S' is a pre-update variable S. At the following step 65, a value of the counter n is incremented. After step 65, a process at step 69 is performed. The process at step 69 will be described further below.

Next, the process at steps 66 to 68 will be described. At step 66, a value of the variable rd is set to Mm (rd=Mm). At the following step 67, a value of the variable S is updated. Specifically, a value of the updated variable S is calculated by using the above-described equation (6). At the following step 68, a value of the counter m is incremented. After step 66, a process at step 69 is performed.

Here, as shown in FIG. 9, the portions which are not shared by the graphs of the subject graphic and the reference graphic can be divided into one or more rectangles. Thus, a difference area can be calculated by calculating an area of each of the above rectangles. The process at steps 63 to 65 and the process at steps 66 to 68 are performed for calculating a difference area by calculating an area of each of the rectangles and performing cumulative addition of the calculated area. In the process at steps 63 to 65 and at steps 66 to 68, the variable rd is set so as to indicate an x coordinate on the right edge of the rectangle, and the variable ld is set so as to indicate an x coordinate on the left edge of the rectangle. In this case, one of $\Theta n$ and $\phi m$ indicates an upper end of the rectangle, and the other indicates a lower end thereof. Thus, an area of the rectangle can be calculated by the above equation (6).

At step 69, a value of the variable ld is updated to a value of the variable rd. At the following step 70, it is determined whether or not a value of the variable rd becomes a value of the reference distance. A process at step 70 is performed for determining whether or not areas of all rectangles included in the portions which are not shared by the graphs of the subject graphic and the reference graphic are calculated. If it is determined at step 70 that a value of the variable rd does not become a value of the reference distance, the process goes back to step 62. Hereinafter, steps 62 to 69 are repeated until a value of the variable rd becomes a value of the reference distance. On the other hand, if it is determined at step 70 that a value of the variable rd becomes a value of the reference distance, a process at step 71 is performed. That is, at step 71, a value of the variable rd is stored in the WRAM 22 as a difference area. As a result, a difference area of the graphs of the reference graphic and the trace graph is calculated.

At step 72 following step 71, it is determined whether or not all reference graphics are compared with the subject graphic. That is, it is determined whether or not a difference area of each of all previously prepared reference graphics is calculated. If it is determined at step 72 that all reference graphics are not compared with the subject graphic, the process goes back to step 60. Steps 60 to 72 are repeated until all reference graphics are compared with the subject graphic. On the other hand, if it is determined at step 72 that all reference graphics are compared with the subject graphic, a process at step 73 is performed. That is, at step 73, a shape of the subject graphic is determined. Specifically, a shape of a reference graphic having the smallest difference area is identified as a shape of the subject graphic. After step 73, the CPU core 21 ends the graphics identification process.

As described above, in the present embodiment, a degree of similarity is determined by using a trace graph and a reference graphic graph, which are generated using a line segment distance and an absolute angle of a subject graphic and a reference graphic. Thus, it is possible to identify a shape of a complicated graphic with accuracy. Especially, by utilizing a step graph as the trace graph and the reference graphic graph, it is possible to reduce the calculation amount of the graphics identification process and perform graphics identification with higher accuracy.

Note that, in the above-described embodiment, comparison between the subject graphic and the reference graphic is performed after a process (step 44) for converting an absolute angle of the first side of the subject graphic and the reference graphic to zero. Here, in other embodiments, the above process may not be performed. In this case, an orientation of the subject graphic on the input surface of the touch panel 13 is considered when comparison between the subject graphic and the reference graphic is performed. That is, a process for converting an absolute angle may not be performed in the case where it is desired to perform graphics identification in view of an orientation of a trace, which is drawn by the user, on the input surface. On the other hand, in the case where it is desired to perform graphics identification without considering an orientation of a trace, which is drawn by the user, on the input surface, the process for converting an absolute angle may be performed.

Also, in the above-described embodiment, a touch panel is taken as one example of an input device for description, but it is not limited thereto. The input device may be any device being capable of allowing the user to draw a trace on the input surface. For example, the input device may be a mouse.

Also, as described above, according to the graphics identification method of the present embodiment, it is possible to perform graphics identification without being influenced by the number of vertices of the subject graphic. Thus, according to the graphics identification method of the present embodiment, it is possible to perform graphics identification with accuracy without reducing the number of vertices by a thinning-out process. Thus, the thinning-out process (step 16), which is performed in the above-described embodiment, may be omitted in other embodiments. That is, in other embodiments, all coordinate points detected by the touch panel 13 may be selected as coordinate points composing the subject graphic. By omitting the thinning-out process, the total processing amount of the graphics identification process can be reduced. Thus, in the case where the processing amount of the thinning-out process is large, the graphics identification method of the present embodiment being capable of omitting the thinning-out process is especially useful.

Also, in the above-described embodiment, an angle of each side of the subject graphic and the reference graphic is an absolute angle calculated with respect to one predetermined direction. That is, an angle of each side of the subject graphic and the reference graphic is either an angle calculated with respect to one predetermined side of the graphic (in the above-described embodiment, the first side of the graphic (see step 44)) or an angle calculated with respect to one predetermined direction of the input surface (in the above-described embodiment, the normal direction of an x-axis of the input surface (see step 43)). In other embodiments, an angle of each side of the subject graphic and the reference graphic may be represented using a relative angle. The relative angle of one side is calculated with respect to an angle of the adjacent side. For example, by utilizing a relative angle calculated with respect to an angle of the previous side, angles $\Theta 1$, $\Theta 2$, $\Theta 3$, $\Theta 4$, and $\Theta 5$ of the sides in the graphical information as shown in FIG. 6B are represented as 50, 70, 70, 60, and 50, respectively. However, when a relative angle is utilized, the subject graphic may not be correctly identified in the case where the thinning-out process cannot be performed properly (see FIG. 10). For example, in FIG. 10, in the case where a relative angle is utilized, an angle of a side connecting the vertex P3' and the vertex P4 becomes rather small compared to an angle of other side, which is approximately 60°. Thus, in a portion corresponding to this side, the trace graph and the reference graphic graph are substantially different in shape. As a result, a degree of similarity between the reference graphic, which is a regular hexagon, and the subject graphic as shown in FIG. 10 is reduced, whereby the subject graphic may not be correctly identified. As such, when a relative angle is utilized, it is necessary to consider that calculation of a degree of similarity is substantially influenced by the relative angle.

Figure 20:
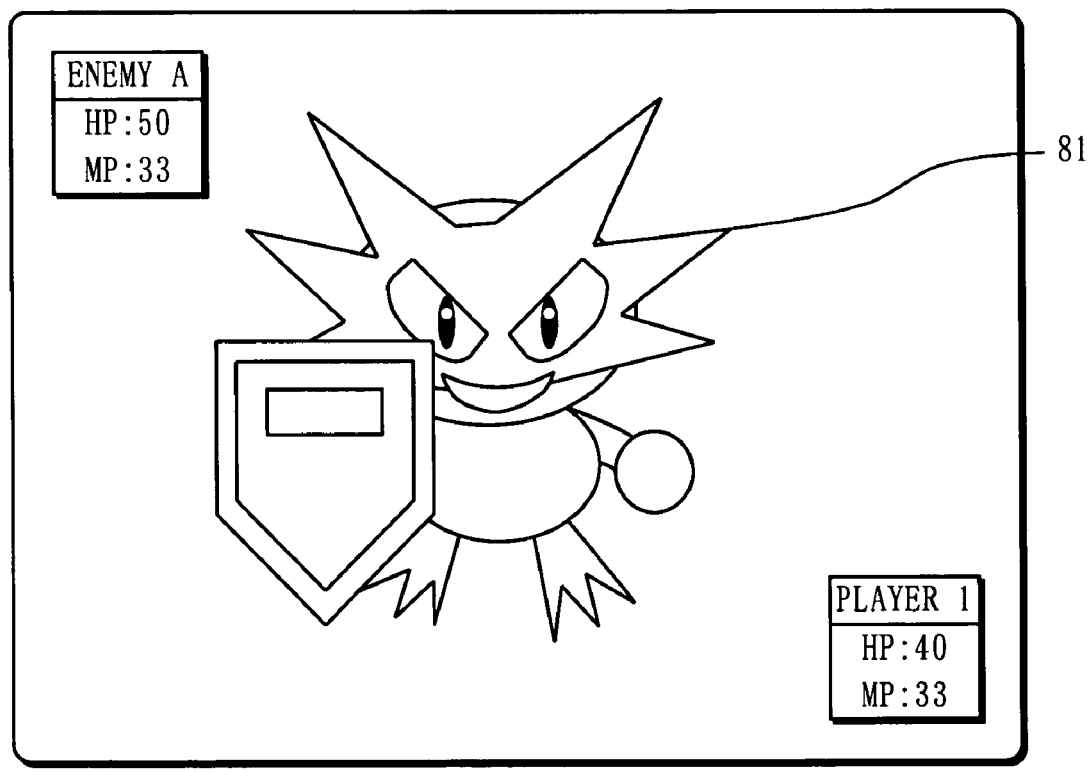
FIG. 20 is an illustration showing an exemplary game screen of a game using a graphics identification program.

Note that the graphics identification program according to the present embodiment can be applied to a game program. Hereinafter, an exemplary game to which the graphics identification program according to the present embodiment is applied will be described. FIG. 20 is an illustration showing an exemplary game screen of a game using the graphics identification program according to the present embodiment. This game is, for example, a role playing game in which a player character operated by a player battles with an enemy character 81. The game screen as shown in FIG. 20 is displayed on the first LCD 11 covered with the touch panel 13. That is, the graphics identification program includes a process for displaying at least one scene of the game space on the first LCD 11 as a game image. The player plays the game for the purpose of defeating the enemy character by giving an instruction, for example, to attack the enemy character 81 using the touch panel 13. Here, an attack instruction is performed by drawing a trace on the input surface of the touch panel 13. That is, the player draws various previously-determined traces on the input surface of the touch panel 13, thereby performing an attack instruction in accordance with a shape of a trace.

Figure 21:
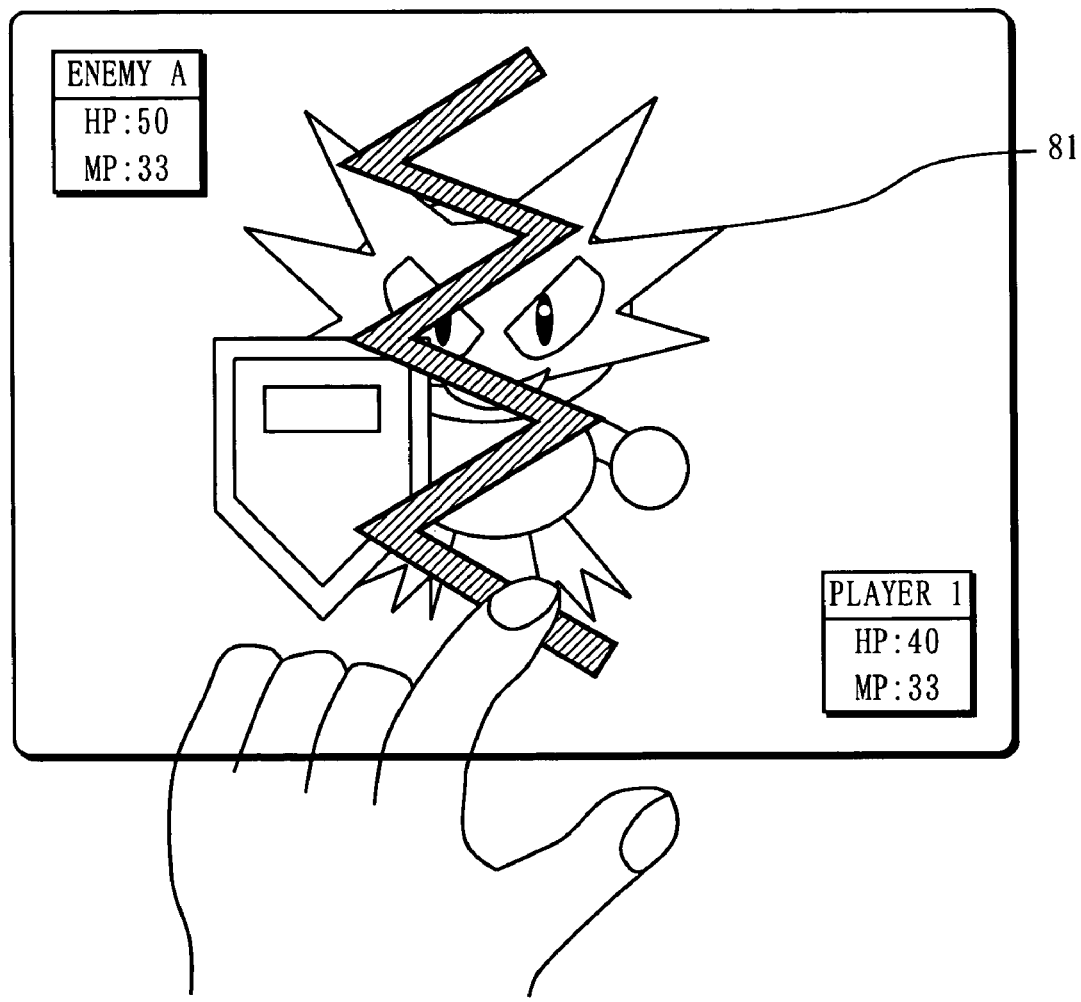
FIG. 21 is an illustration showing an exemplary game screen of a game using the graphics identification program.
Figure 22:
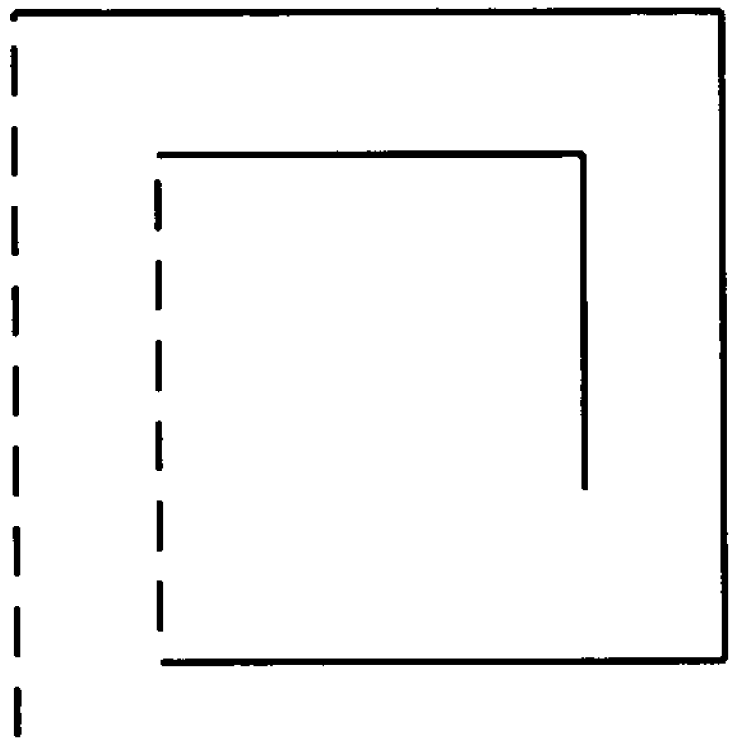
FIG. 22 is an illustration showing one example of a complicated graphic.

Specifically, in the game program of the above-described exemplary game, a correspondence between a previously-determined graphic (corresponding to the above-described reference graphic) and a method for attack (to the enemy character) by the player character (for example, an attack by a sword or magic, etc.) is defined. The player performs an input for the touch panel 13 by drawing a graphic corresponding to his/her desired attack method. For example, as shown in FIG. 21, the player draws a trace with a sawtooth shape (shaded portions as shown in FIG. 21) on the enemy character 81. The game apparatus 1 identifies a correspondence between a shape of the trace drawn by the player and one of a plurality of previously-determined graphics by using the graphics identification program according to the present embodiment. Further, by executing a game process associated with the identified reference graphic, the game apparatus 1 causes the game image to change depending on the type of the reference graphic. Specifically, an attack to the enemy character is performed in accordance with an attack method corresponding to the identified reference graphic, and an effect display indicating an effect of the performed attack is displayed on the first LCD 11. As a result, parameters of the enemy character are reduced according to the attack method and the effect of the attack. As such, the attack method to the enemy character is determined based on a shape of the identified graphic. For example, in the case where a shape of the trace drawn by the player is a triangle, an attack by a sword is selected. On the other hand, a shape of the trace is a quadrangle, an attack by magic is selected.

As shown in the above-described exemplary game, the graphics identification program can be applied to a game causing the player to draw a predetermined graphic. Here, a commonly-used information processing device rarely causes the user to draw a complicated graphic which is not used in an actual world. However, the game apparatus may purposefully cause the user to draw a complicated graphic in the case where input of the complicated graphic is required to work magic, thereby making the game more exciting. For example, in the above-described exemplary game, a graphics input skill for inputting a complicated graphic in a short time can be reflected in the game space by raising the attacking capability depending on the difficulty level of a graphic. As a result, enjoyment of the game is enhanced, whereby the game can be more exciting. Thus, it is remarkably effective to apply the graphics identification program according to the present embodiment, which is capable of identifying a complicated graphic, to a game program.

The above-described graphics identification program and the information processing device can be utilized in a game apparatus, etc., executing a game process for causing the user to draw a predetermined graphic.

While the invention has been described in detail, the foregoing description is in all aspects illustrative and not restrictive. It is understood that numerous other modifications and variations can be devised without departing from the scope of the invention.

What is claimed is:

1. A computer readable storage medium for storing a graphics identification program to be executed by a computer for identifying a graphical shape of a trace drawn by a user on an input surface of an input device, wherein the graphics identification program causes the computer to execute:
   detecting the trace drawn on the input surface as coordinate points in chronological order;
   selecting coordinate points for representing the trace from among a group of the coordinate points in which the detected coordinate points are arranged in chronological order;
   calculating lengths of line segments obtained by connecting the selected coordinate points in chronological order;
   calculating, for each line segment, an absolute angle which the line segment forms with a previously determined reference straight line or a relative angle which the line segment forms with a line segment adjacent thereto; and
   comparing a trace graph in an orthogonal coordinate system, whose first axis indicates a distance from a starting point or an ending point of the selected coordinate points to each coordinate point along the line segment and whose second axis indicates an angle of the line segment whose startpoint is one of the selected coordinate points, with reference graphic graphs respectively representing a plurality of types of previously prepared reference graphics in the orthogonal coordinate system, and identifying a reference graphic represented by a reference graphic graph which most closely resembles the trace graph as a shape of the trace,
   wherein the graphics identifying further includes:
      calculating an area of a region surrounded by line segments which are not shared by the trace graph and the reference graphic graph in the orthogonal coordinate system for each reference graphic, and
      identifying a reference graphic having a smallest area among the areas calculated at the area calculating as a shape of the trace.

2. The storage medium according to claim 1, wherein the trace graph and the reference graphic graph are represented as a step graph in which a portion corresponding to the line segment is composed of a straight line component parallel to the first axis.

3. The storage medium according to claim 1, wherein the graphics identification program further causes the computer to execute normalizing, before comparison between the trace graph and the reference graphic graph is performed at the graphics identifying, a cumulative length of the trace graph while keeping a percentage of a length of each line segment of the trace graph so that a cumulative length of the line segments of the trace graph is equal to a cumulative length of the reference graphic graph.

4. The storage medium according to claim 1, wherein the coordinate point selecting selects coordinate points by thinning out a coordinate point lying within a predetermined distance from a straight line connecting two predetermined coordinate points from the group of the detected coordinate points.

5. The storage medium according to claim 1, wherein the coordinate point selecting selects all of the detected coordinate points.

6. The storage medium according to claim 1, wherein the detecting detects the trace which is drawn without lifting a stylus from the input surface as coordinate points in chronological order.

7. The storage medium according to claim 1, wherein a display device is connected to the computer, and
   wherein the graphics identification program further causes the computer to execute:
      displaying a scene of at least a portion of a game space on the display device as a game image; and
      causing the game image to change by executing a game process associated with the reference graphic identified as a shape of the trace at the graphics identifying depending on a type of the reference graphic.

8. A game apparatus for identifying a graphical shape of a trace drawn by a user on an input surface of an input device, changing game progress based on the identification results, and displaying the change on a display device, comprising:
   a reference graphic storage location for storing a distance from a starting point or an ending point of vertices of each of a plurality of reference graphics, which is composed of a plurality of vertices and line segments connecting between the vertices, to each vertex along each line segment, and an absolute angle which the line segment forms with a previously determined reference straight line or a relative angle which the line segment forms with a line segment adjacent thereto;

a detector for detecting the trace drawn on the input surface as coordinate points in chronological order;

a coordinate point selector for selecting coordinate points for representing the trace from a group of the coordinate points in which the detected coordinate points are arranged in chronological order;

a length calculator for calculating lengths of line segments obtained by connecting the selected coordinate points in chronological order;

an angle calculator for calculating, for each line segment, an absolute angle which the line segment forms with a previously determined reference straight line or a relative angle which the line segment forms with a line segment adjacent thereto; and a graphics identifier for comparing a trace graph in an orthogonal coordinate system, whose first axis indicates a distance from a starting point or an ending point of the selected coordinate points to each coordinate point along the line segment and whose second axis indicates an angle of the line segment whose startpoint is one of the selected coordinate points, with a reference graphic graph representing each of a plurality of types of reference graphics stored in the reference graphic storage location in the orthogonal coordinate system, and identifying a reference graphic represented by a reference graphic graph which most closely resembles the trace graph as a shape of the trace, wherein the graphics identifier includes:
  an area calculator for calculating an area of a region surrounded by line segments which are not shared by the trace graph and the reference graphic graph in the orthogonal coordinate system for each reference graphic; and
  an identifier for identifying a reference graphic having a smallest area among the areas calculated by the area calculator as a shape of the trace.

9. The game apparatus according to claim 8, wherein the trace graph and the reference graphic graph are represented as a step graph in which a portion corresponding to the line segment is composed of a straight line component parallel to the first axis.

10. The game apparatus according to claim 8, further comprising a normalizer for normalizing a cumulative length of the trace graph while keeping a percentage of a length of each line segment of the trace graph so that a cumulative length of the line segments of the trace graph is equal to a cumulative length of the reference graphic graph before comparison between the trace graph and the reference graphic graph is performed by the graphics identifier.

11. The game apparatus according to claim 8, wherein the coordinate point selector selects coordinate points by thinning out a coordinate point lying within a predetermined distance from a straight line connecting two predetermined coordinate points from the group of the detected coordinate points.

12. The game apparatus according to claim 8, wherein the coordinate point selector selects all of the detected coordinate points.

13. A graphics identification method executed by a computer for identifying a graphical shape of a trace drawn by a user on an input surface of an input device, comprising:

detecting the trace drawn on the input surface as coordinate points in chronological order;

selecting coordinate points for representing the trace from among a group of the coordinate points in which the detected coordinate points are arranged in chronological order;

calculating lengths of line segments obtained by connecting the selected coordinate points in chronological order;

calculating, for each line segment, an absolute angle which the line segment forms with a previously determined reference straight line or a relative angle which the line segment forms with a line segment adjacent thereto; and comparing a trace graph in an orthogonal coordinate system, whose first axis indicates a distance from a starting point or an ending point of the selected coordinate points to each coordinate point along the line segment and whose second axis indicates an angle of the line segment whose startpoint is one of the selected coordinate points, with a reference graphic graph representing each of a plurality of types of previously prepared reference graphics in the orthogonal coordinate system, and identifying a reference graphic represented by a reference graphic graph which most closely resembles the trace graph as a shape of the trace, wherein the graphics identifying further includes:
  calculating an area of a region surrounded by line segments which are not shared by the trace graph and the reference graphic graph in the orthogonal coordinate system for each reference graphic; and
  identifying a reference graphic having a smallest area among the areas calculated at the area calculating as a shape of the trace.

* * * * *